(12) United States Patent
Duan et al.

(10) Patent No.: US 10,896,551 B2
(45) Date of Patent: *Jan. 19, 2021

(54) ALLOCATING VIRTUAL OBJECTS BASED ON AUGMENTED REALITY

(71) Applicant: Advanced New Technologies Co., Ltd., Grand Cayman (KY)

(72) Inventors: Qinglong Duan, Hangzhou (CN); Guanhua Chen, Hangzhou (CN); Jing Ji, Hangzhou (CN); Jiahui Cheng, Hangzhou (CN); Lu Yuan, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/903,993

(22) Filed: Jun. 17, 2020

(65) Prior Publication Data
US 2020/0320799 A1   Oct. 8, 2020

Related U.S. Application Data

(63) Continuation of application No. 15/839,512, filed on Dec. 12, 2017, now Pat. No. 10,692,297.

(30) Foreign Application Priority Data

Dec. 13, 2016 (CN) .......................... 2016 1 1146666

(51) Int. Cl.
*G06T 19/20* (2011.01)
*G06T 19/00* (2011.01)
(Continued)

(52) U.S. Cl.
CPC .............. *G06T 19/20* (2013.01); *G06F 16/29* (2019.01); *G06K 9/00671* (2013.01);
(Continued)

(58) Field of Classification Search
CPC ................... G06T 19/20; G06T 19/006; G06T 2219/2004; G06F 16/29; G06K 9/00671;
(Continued)

(56) References Cited

U.S. PATENT DOCUMENTS 8,769,437 B2   7/2014   Myllyla
8,968,099 B1   3/2015   Hanke et al.
(Continued)

FOREIGN PATENT DOCUMENTS

CN   102980570   3/2013
CN   104461318   3/2015
(Continued)

OTHER PUBLICATIONS

Caldwell et al., "Beginner's guide: How to Play Pokemon Go," Nov. 2016, retrieved from: URL<https:www.imore.com/pokemon-go-beginners-guide>.
(Continued)

*Primary Examiner* — Xin Sheng
(74) *Attorney, Agent, or Firm* — Fish & Richardson P.C.

(57) ABSTRACT

A method of allocating virtual objects based on augmented reality (AR) includes displaying, by an AR client terminal of a receiving user, a live map associated with a location of the receiving user. The live map includes a target location to which a virtual object was bound by a distributing user. The AR client terminal of the receiving user scans an image of an environment of the target location. In response to determining that the scanned image includes a preset bound target, the AR client terminal of the receiving user receives information of the virtual object from a server terminal. The preset bound target is associated with the virtual object and the target location.

15 Claims, 14 Drawing Sheets

(51) Int. Cl.
*H04M 1/725* (2006.01)
*G06K 9/00* (2006.01)
*G06F 16/29* (2019.01)
*G06Q 20/06* (2012.01)
*G06Q 20/00* (2012.01)
*G06Q 20/32* (2012.01)
*G06Q 30/02* (2012.01)

(52) U.S. Cl.
CPC .......... *G06Q 20/00* (2013.01); *G06Q 20/065* (2013.01); *G06Q 20/3224* (2013.01); *G06Q 30/02* (2013.01); *G06T 19/006* (2013.01); *H04M 1/72544* (2013.01); *G06T 2219/2004* (2013.01)

(58) Field of Classification Search
CPC ............ G06Q 20/065; G06Q 20/3224; H04M 1/72544; H04W 4/02
See application file for complete search history.

(56) References Cited

U.S. PATENT DOCUMENTS

| | | |
|---|---|---|
| 10,692,297 B2 | 6/2020 | Duan et al. |
| 2013/0178257 A1 | 7/2013 | Langseth |
| 2014/0176748 A1 | 6/2014 | Cohen et al. |
| 2014/0240523 A1 | 8/2014 | Dodla |
| 2015/0092061 A1 | 4/2015 | Chao et al. |
| 2015/0109338 A1 | 4/2015 | McKinnon et al. |
| 2015/0325054 A1 | 11/2015 | Salter et al. |
| 2016/0155295 A1 | 6/2016 | Mound |
| 2016/0178380 A1 | 6/2016 | Iwaizumi et al. |
| 2016/0335289 A1 | 11/2016 | Andrews |

FOREIGN PATENT DOCUMENTS

| | | |
|---|---|---|
| CN | 104596523 | 5/2015 |
| CN | 106056369 | 10/2016 |
| JP | 2013059573 | 4/2013 |
| JP | 2014217566 | 11/2014 |
| JP | 201545583 | 3/2015 |
| KR | 20130086509 | 8/2013 |
| KR | 20150052458 | 5/2015 |
| WO | WO 2013132171 | 9/2013 |

OTHER PUBLICATIONS

Carter, "At this point we have ample knowledge of region exclusive Pokemon Go creatures," Jul. 2016, retrieved from: URL<www.destructoid.com/at-this-point-we-have-ample-knowledge-of-region-exclusive-pokemon-gor-creatures-377609.phtml>.

Crosby et al., "BlockChain Technology: Beyond Bitcoin," Sutardja Center for Entrepreneurship & Technology Technical Report, Oct. 16, 2015, 35 pages.

Extended European Search Report in European Application No. 17879998.7, dated Aug. 12. 2019, 9 pages.

International Preliminary Report on Patentability in International Application No. PCT/US2017/066040, dated Feb. 14, 2019, 27 pages.

International Search Report and Written Opinion of the International Searching Authority issued in International Application No. PCT/US2017/066040 dated Mar. 8, 2018; 10 pages.

Nakamoto, "Bitcoin: A Peer-to-Peer Electronic Cash System," www.bitcoin.org, 2005, 9 pages.

Sato et al, "Utilization of ICT is Indispensable for Real Local Revitalization Utilization of ICT for Local Revitalization" in Monthly J-LIS—Local Authority Information Magazine, Japan Agency for Local Authority Information Systems, May 1, 2015, 15 pages (with English translation).

Danny, "Pokomon GO Augmented Reality Branded Products Come Here," Brand Story, Aug. 31, 2016, 3 pages.

ALLOCATING VIRTUAL OBJECTS BASED ON AUGMENTED REALITY

This application claims the benefit of priority to and is a continuation of U.S. patent application Ser. No. 15/839,512, filed Dec. 12, 2017, which claims priority to Chinese Patent Application No. 201611146666.3, filed on Dec. 13, 2016, each of which are incorporated by reference in their entirety.

BACKGROUND

Augmented reality (AR) technology augments an image of a real-world environment (that is, reality) by superimposing supplemental information (such as, pictures, videos, three-dimensional (3D) models, and other sensory enhancements) onto the real-word environment. The AR technology overlays virtual objects onto the image of the real world, enhancing a user's perception of reality and providing a user with an immersive, interactive experience.

SUMMARY

The present disclosure describes allocating virtual objects based on augmented reality (AR).

In an implementation, an AR client terminal of a receiving user displays a live map associated with a location of the receiving user. The live map includes a target location to which a virtual object was bound by a distributing user. The AR client terminal of the receiving user scans an image of an environment of the target location. In response to determining that the scanned image includes a preset bound target, the AR client terminal of the receiving user receives information of the virtual object from a server terminal. The preset bound target is associated with the virtual object and the target location.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented in particular implementations, so as to realize one or more of the following advantages. First, the described approach enhances user experiences for distributing and receiving virtual objects. Second, the described approach improves user interactivity and enjoyment using AR technologies.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

Figure 1:
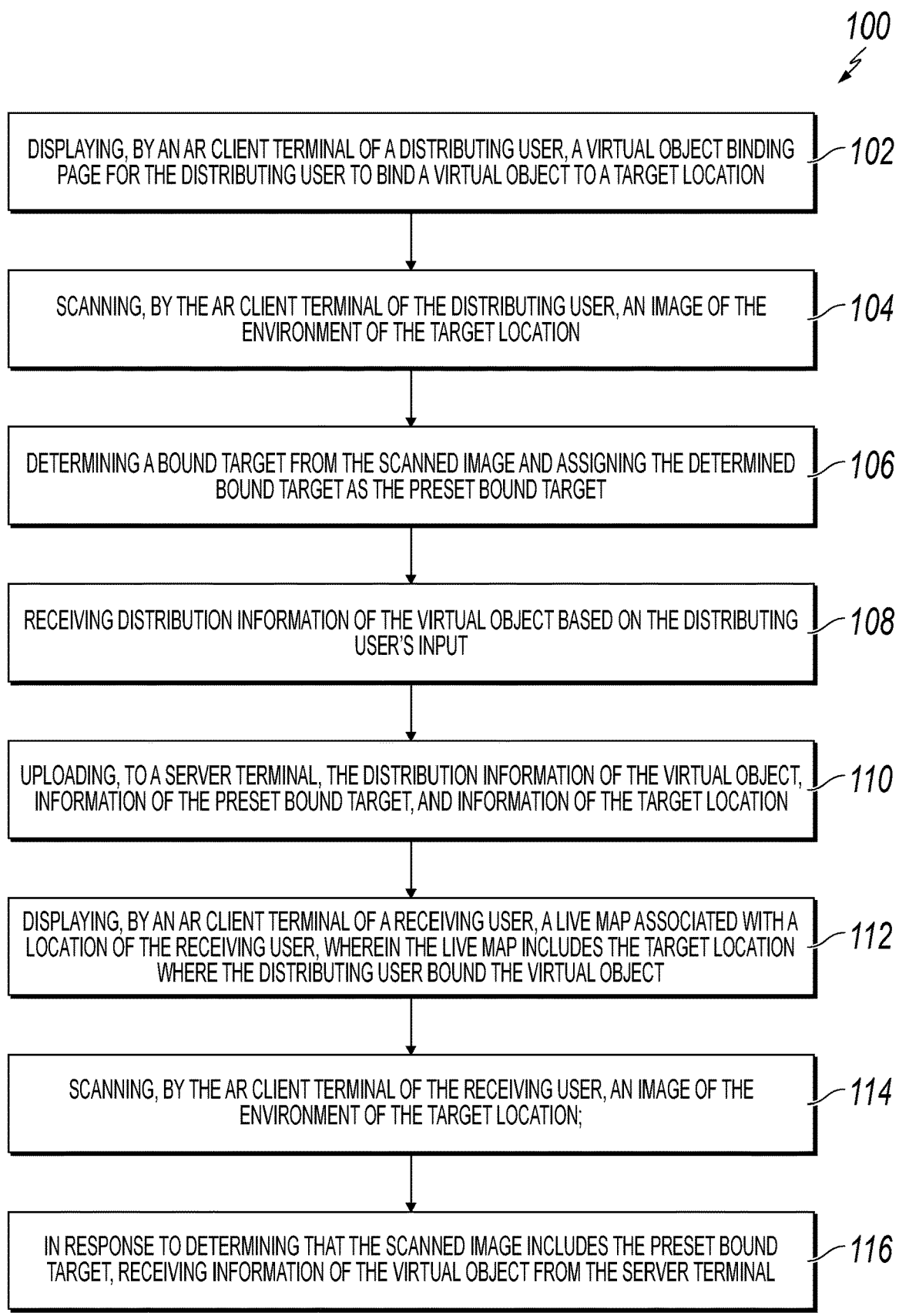
FIG. 1 is a flowchart illustrating an example of a computer-implemented method for distributing and receiving virtual objects based on augmented reality (AR) technologies, according to an implementation of the present disclosure.

The following detailed description describes allocating virtual objects based on augmented reality (AR), and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

AR technology augments an image of a real-world environment (that is, reality) by superimposing supplemental information (such as, pictures, videos, three-dimensional (3D) models, and other sensory enhancements) onto the real-word environment. The AR technology overlays virtual objects onto the image of the real world, enhancing a user's perception of reality and providing a user with an immersive, interactive experience.

At a high level, the described approach improves user experiences of distributing and receiving virtual objects using AR technologies. A virtual object can be any type of virtual object that can be allocated or distributed online, such as an electronic certificate, an electronic voucher, an electronic coupon, a virtual "red envelope" that includes an electronic greeting card or an electronic cash gift, or any electronic information. A virtual-object-distributing user (also called a distributing user) can bind (or hide) one or more virtual objects to a particular location, and a virtual-object-receiving user (also called a receiving user) can receive (or find) one or more of the virtual objects when the receiving user is at that particular location. For example, the distributing user and the receiving user each have an AR client terminal. When the distributing user binds a virtual object to a target location, the distributing user uses his or her AR client terminal to scan an image of the surrounding environment of the target location. A bound target (for example, an image object) can be recognized from the scanned image. The recognized bound target is considered as a preset bound target associated with the virtual object and the target location. The virtual object is bound to (or hidden at) the target location when information of the preset bound target, the virtual object, and the target location is stored at a server terminal.

For helping a receiving user to find a virtual object, the server terminal sends a live map for the receiving user's AR client terminal to display. The live map corresponds to the current location of the receiving user and shows target locations to which virtual objects have been bound by other users in advance. When the receiving user approaches a target location to which a virtual object has been bound, the receiving user's AR client terminal can prompt the receiving user to scan an image of the surrounding environment. If the image scanned by the receiving user includes a preset bound target associated with a virtual object, the server terminal sends information of the virtual object to the receiving user so that the receiving user's AR client terminal displays the received virtual object in an AR scene (a scene displayed by an AR client terminal, which is an environmental scene overlaid with virtual objects).

An AR client terminal can be software, hardware, or a combination of software and hardware developed based on AR technologies or integrated with AR service functions. For example, the AR client terminal can be an ALIPAY™ app integrated with an AR service function. In some cases, an AR client terminal is a user's mobile terminal, such as a smart phone or tablet-type computer. An AR client terminal can also be a wearable device, such as AR glasses, headset, or helmet. The AR client terminal can perform image scanning of an environmental scene (for example, an image in view of the AR client terminal) and transmit the scanned image to a server terminal in real time.

A server terminal can be a server, a server cluster, or a cloud platform based on a server cluster. The server terminal can provide services to an AR client terminal. For example, the server terminal may be a payment platform that provides services for an ALIPAY™ app that integrates an AR service function. The server terminal (or a back-end AR engine in the server terminal) can perform image recognition on the image scanned by an AR client terminal and recognize contents or image objects in the image. The server terminal can also manage virtual data related to virtual objects. The virtual data can include information of virtual objects to be overlaid on an environmental scene image scanned by the AR client terminal. Based on the results of the image recognition, the server terminal can send related virtual data to the AR client terminal. Based on the received the virtual data, the AR client terminal (or a front-end AR engine in the AR client terminal) can display the virtual objects and superimpose the virtual objects on the environmental scene image scanned by the AR client terminal. For example, if the image scanned by a receiving user's AR client terminal includes a preset bound target associated with a virtual object, the server terminal sends information of the virtual object to the receiving user and the receiving user's AR client terminal displays the virtual object in the AR scene.

In some implementations, the AR client terminal can perform the image recognition instead of the server terminal. For example, the AR client terminal can perform image recognition on the scanned image to identify image objects or contents in the scanned image. The AR client terminal can send information of the identified image objects to the server terminal so that the server terminal can send virtual data related to the identified image objects to the AR client terminal.

A bound target can be an image object or content recognized in a scanned image by an image recognition algorithm. For example, a bound target can be a quick response (QR) code image, a logo image, or an image area with salient features (such as an image area including a store name, a street name, or an address number).

Figure 2:
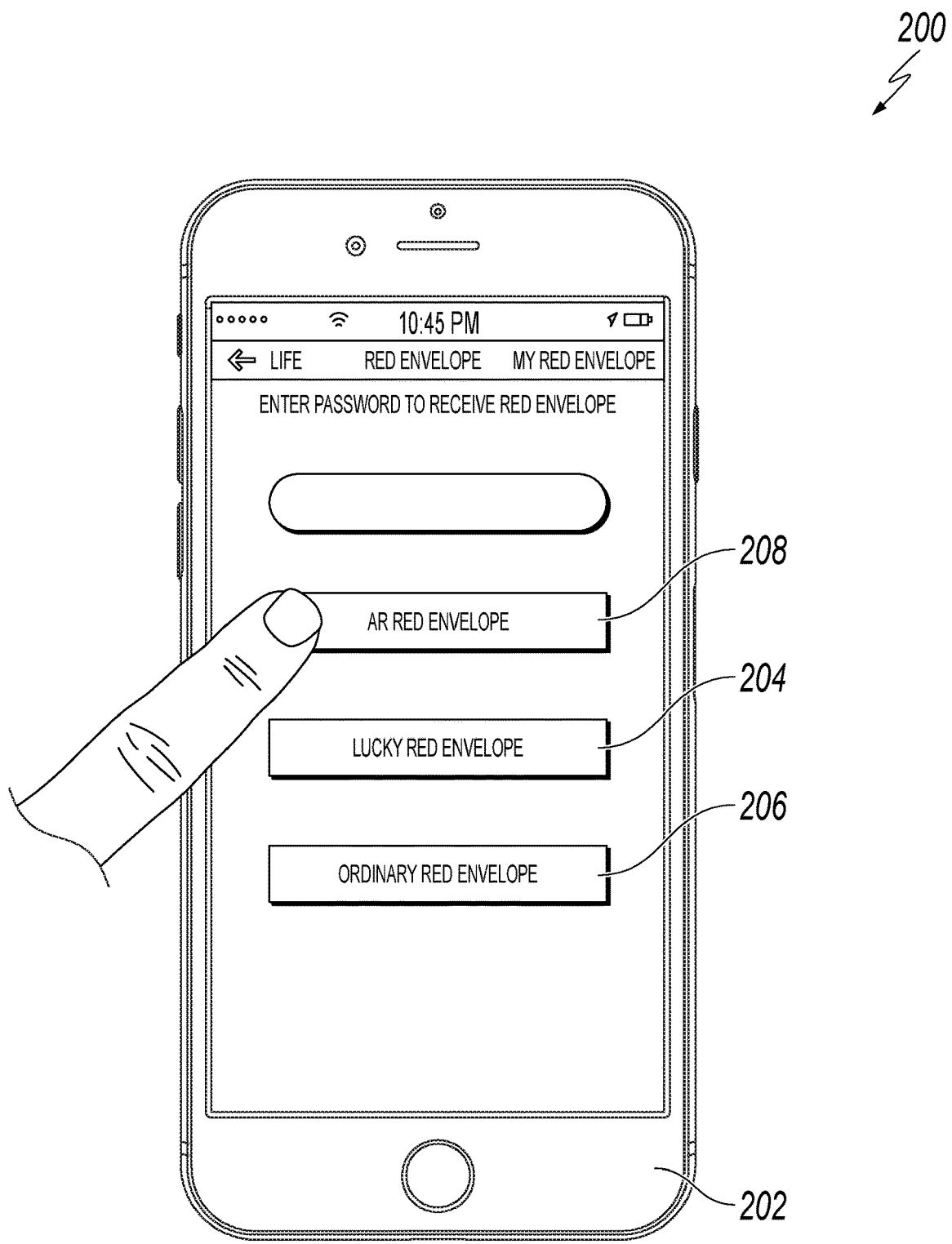
FIG. 2 is a schematic diagram illustrating a first example of a user interface for activating distribution and reception of virtual objects based on AR technologies, according to an implementation of the present disclosure.
Figure 3:
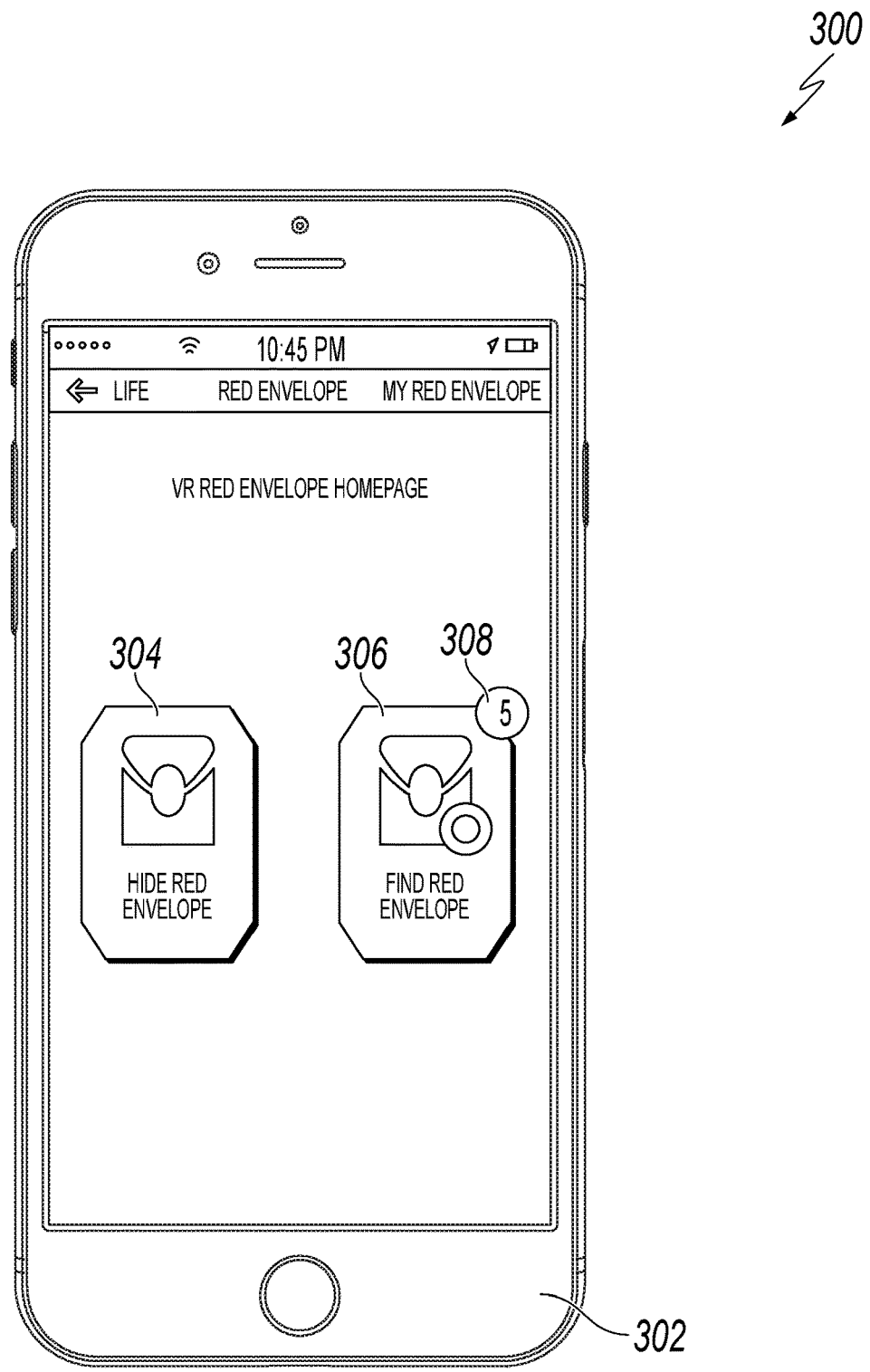
FIG. 3 is a schematic diagram illustrating a second example of a user interface for activating distribution and reception of virtual objects based on AR technologies, according to an implementation of the present disclosure.

FIG. 1 is a flowchart illustrating an example of a computer-implemented method 100 for distributing and receiving virtual objects based on AR technologies, according to an implementation of the present disclosure. For clarity of presentation, the description that follows generally describes method 100 in the context of the other figures in this description. However, it will be understood that method 100 can be performed, for example, by any system, environment, software, and hardware, or a combination of systems, environments, software, and hardware, as appropriate. In some implementations, various steps of method 100 can be run in parallel, in combination, in loops, or in any order. Although the following description describes distributing and receiving red envelopes, it is understood that method 100 is applicable to any other virtual objects. Various steps in FIG. 1 are further illustrated by FIGS. 2-9. For example, FIGS. 2-3 illustrate user interfaces for activating distribution and reception of virtual objects based on AR technologies. FIGS. 4-7 and steps 102-110 of FIG. 1 describe how a distributing user binds a virtual object to a location, and FIGS. 8-9 and steps 112-116 of FIG. 1 describe how a receiving user receives a virtual object.

FIG. 2 is a schematic diagram illustrating a first example of a user interface 200 for activating distribution and reception of virtual objects based on AR technologies, according to an implementation of the present disclosure. The user interface 200 is displayed by a user's AR client terminal 202. In addition to conventional function options such as "lucky red envelope" option 204 and "ordinary red envelope" option 206, the interface 200 also provides an "AR red envelope" option 208. The user can trigger an AR-based distribution of red envelopes by clicking, tapping, or performing other gestures on or near the option 208. After the "AR red envelope" option 208 is selected, the AR client terminal may enter an "AR red envelope homepage" as shown in FIG. 3.

FIG. 3 is a schematic diagram illustrating a second example of a user interface 300 for activating distribution and reception of virtual objects based on AR technologies, according to an implementation of the present disclosure. The user interface 300 is displayed by a user's AR client terminal 302. The user interface 300 has two options, "hide red envelope" option 304 and "find red envelope" option 306. Upon selecting "find red envelope" option 306, the AR client terminal 302 can display a live map for helping the user to find and receive a red envelope. Upon selecting "hide red envelope" option 304, the AR client terminal 302 can display a virtual object binding page (for example, FIG. 4) for the user to hide or bind red envelopes to the current location of the user.

Figure 4:
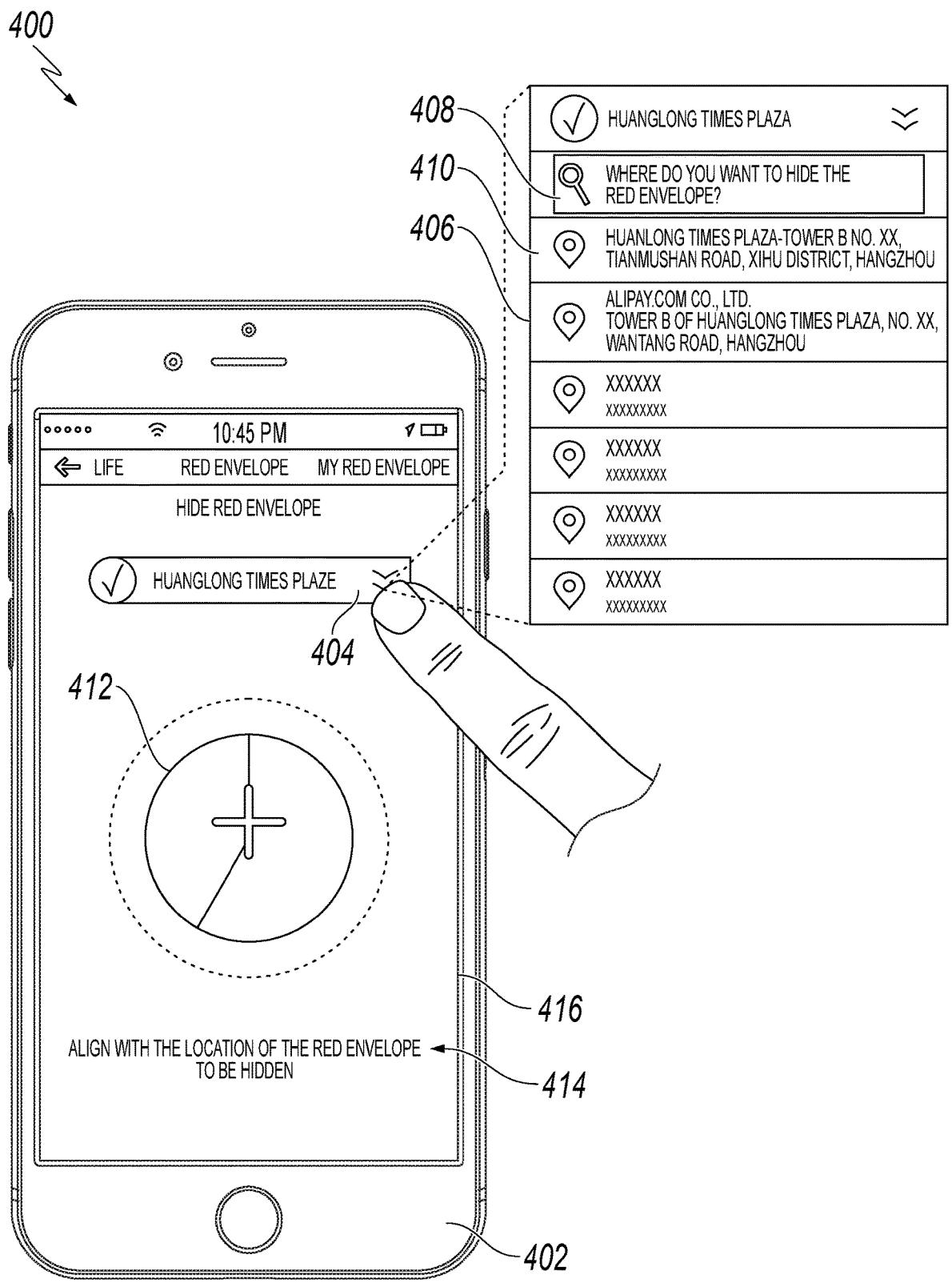
FIG. 4 is a schematic diagram illustrating a first example of a user interface for a distributing user to distribute virtual objects based on AR technologies, according to an implementation of the present disclosure.

Turing to FIG. 1, at 102, a distributing user's AR client terminal displays a virtual object binding page (or a virtual object binding interface) for binding virtual object(s) to the current location of the distributing user. For example, the binding page in FIG. 4 is displayed upon the distributing user selecting "hide red envelope" option 304 in FIG. 3. In some implementations, the binding page can be a real-time image scanning interface for the distributing user to scan image(s) of the surrounding environment (that is, a background picture of the binding page is a real-world scene picture of the current location of the distributing user). From 102, method 100 proceeds to 104.

At 104, the distributing user's AR client terminal scans image(s) of the surrounding environment of the current location. From 104, method 100 proceeds to 106.

At 106, the distributing user's AR client terminal determines a bound target from the scanned image and assigns the determined bound target as the preset bound target. From 106, method 100 proceeds to 108.

At 108, the distributing user's AR client terminal receives distribution information of the virtual object based on the distributing user's input. As will be discussed in FIG. 6, the distribution information can include information, such as the number of virtual object(s) to be distributed or the target population for receiving the virtual object(s). From 108, method 100 proceeds to 110.

At 110, the distributing user's AR client terminal uploads the distribution information of the virtual object, information of the preset bound target, and the distributing user's location to a server terminal. The server terminal establishes a binding relationship among the virtual object, the preset bound target, and the corresponding location. From 110, method 100 proceeds to 112.

At 112, a receiving user's AR client terminal displays a live map (for example, FIG. 8) associated with the current location of the receiving user. The live map includes the target location where the distributing user bound the virtual object. From 112, method 100 proceeds to 114.

Figure 9:
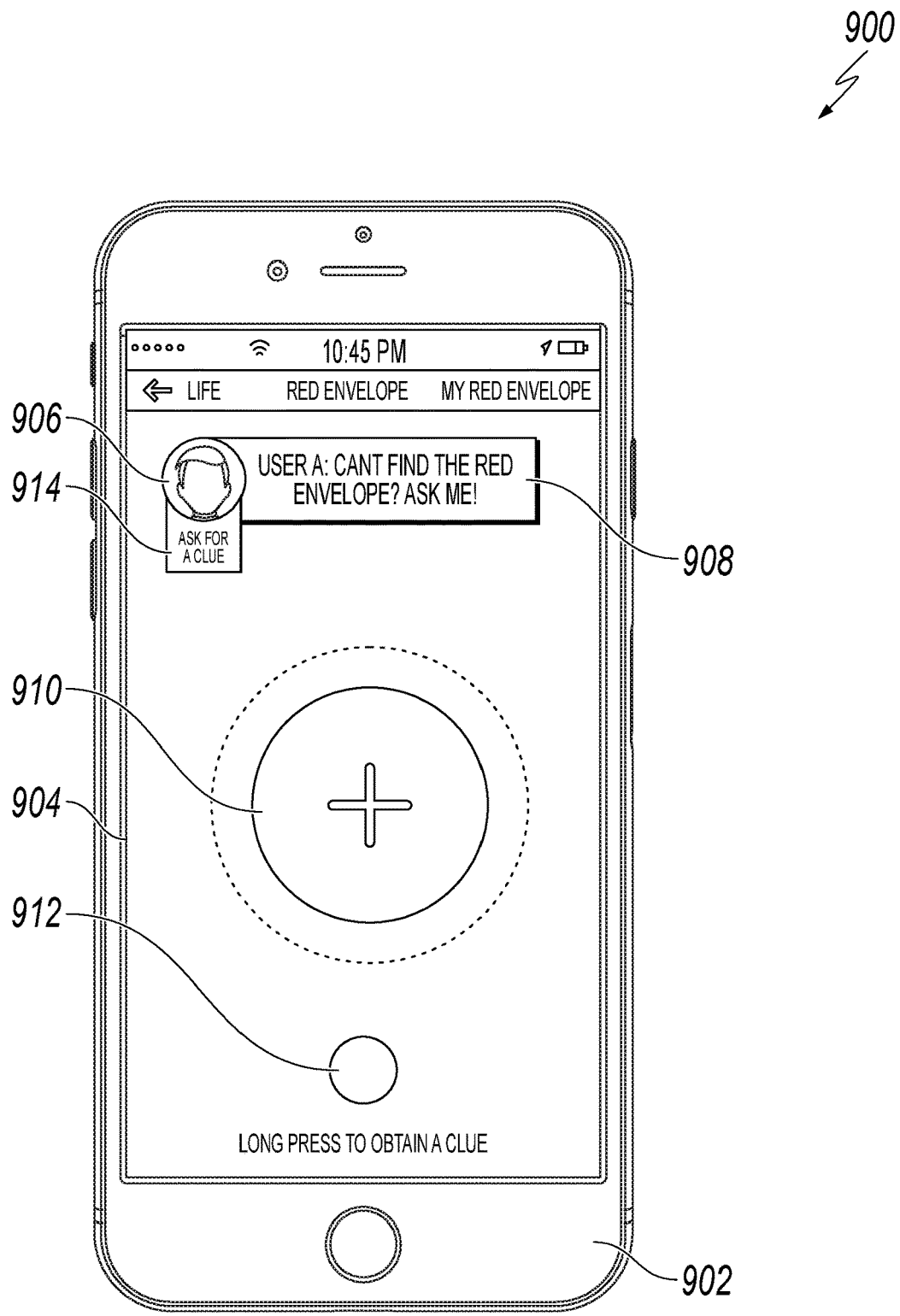
FIG. 9 is a schematic diagram illustrating a second example of a user interface for a receiving user to find and receive virtual objects based on AR technologies, according to an implementation of the present disclosure.

At 114, upon the receiving user performing a gesture on the target location in the live map, the receiving user enters a virtual object search page (for example, FIG. 9). The virtual object search page provides an image scanning prompt, and the receiving user's AR client terminal scans an image of the surrounding environment. From 114, method 100 proceeds to 116.

At 116, in response to determining that the image scanned by the receiving user includes the preset bound target (which is from the image scanned by the distributing user), the receiving user's AR client terminal receives information of the virtual object from the server terminal. From 116, method 100 stops.

FIG. 4 is a schematic diagram illustrating a first example of a user interface 400 for a distributing user to distribute virtual objects based on AR technologies, according to an implementation of the present disclosure. The user interface 400 includes a virtual object binding page 416 displayed by the distributing user's AR client terminal 402. After the distributing user enters the binding page 416 by selecting the option 304 in FIG. 3, the distributing user's AR client terminal 402 can determine the current location of the distributing user, and present the determined location in the binding page 416. In some implementations, the location determined by the AR client terminal 402 may not be precise or may have some error. The binding page 416 can enable the distributing user to correct or refine the location. After determining the location of the distributing user, the AR client terminal 402 displays the location of the distributing user on the binding page 416. For example, the current location of the distributing user is "Huanglong Times Plaza" and displayed in the text box 404. In some implementations, a drop-down list 406 can be further displayed after tapping, clicking, or performing other gestures on or near the text box 404.

The drop-down list 406 can include an address input field 408, as well as addresses near or related to the current location of the distributing user. For example, an address item 410 indicates "Huanglong Times Plaza—Tower B", which is a building in Huanglong Times Plaza. By doing so, if the distributing user is not satisfied with the location information provided in the text box 404, the distributing user can perform a gesture (for example, tap or click) on the text box 404, and input an address related to the current location in the address input field 408, or select an address from the drop-down list 406, for "hiding" the red envelopes. For example, as shown in FIG. 4, the AR client terminal 402 determines that the current location of the distributing user is "Huanglong Times Plaza." If the precise location of the distributing user is Tower B of Huanglong Times Plaza, the distributing user can manually input the precise location "Tower B of Huanglong Times Plaza" in the address input field 408, or select the address item 410 "Huanglong Times Plaza—Tower B" from the address drop-down list 406.

After determining the location for "hiding" the red envelopes, the AR client terminal 402 can further output an image scanning prompt 412 in the binding page 416. For example, the image scanning prompt 412 can include a dynamic scanning box (for example, a dynamically rotating ring-shaped scanning box) for prompting the distributing user to perform image scanning of the surrounding environment of the current location. In some cases, a prompt text 414 (for example, a prompt text "align with the location of the red envelope to be hidden") is displayed under the image scanning prompt 412.

Content of the prompt text 414 can be updated during the image scanning. For example, during the image scanning of the surrounding environment, if the image recognition algorithm does not successfully recognize any image object or image content in the scanned image or the quality (for example, the resolution) of the scanned image is not high enough, the prompt text 414 may be updated to "please keep the camera stable", or other text prompts for guiding the user to perform image scanning. In some cases, after the AR client terminal 402 outputs the image scanning prompt 412 in the binding page 416, the AR client terminal 402 can invoke a camera in the AR client terminal to perform real-time image scanning on the surrounding environment of the distributing user, and invoke an image recognition algorithm to perform image recognition on the scanned image. One or more image objects can be recognized from the scanned image. The recognized image object(s) can be served as the preset bound target.

The image recognition can be performed by the AR client terminal 402 or by a server terminal. In some implementations, the AR client terminal 402 performs the image recognition and upload the image recognition results (for example, the recognized image object or content) to the server terminal. In some implementations, the AR client terminal 402 uploads the scanned image or information of the scanned image to the server terminal in real time. The server terminal performs the image recognition and sends the image recognition results to the AR client terminal 402. In some implementations, the image recognition can be performed by a deep learning model trained based on a neural network in combination with image recognition samples.

In some implementations, after one or more image objects are recognized in the scanned image, the AR client terminal 402 may output a "confirm binding" user option in the binding page 416. By selecting the "confirm binding" user option, the distributing user can enter a configuration page for binding red envelopes to the current location of the distributing user.

Figure 5:
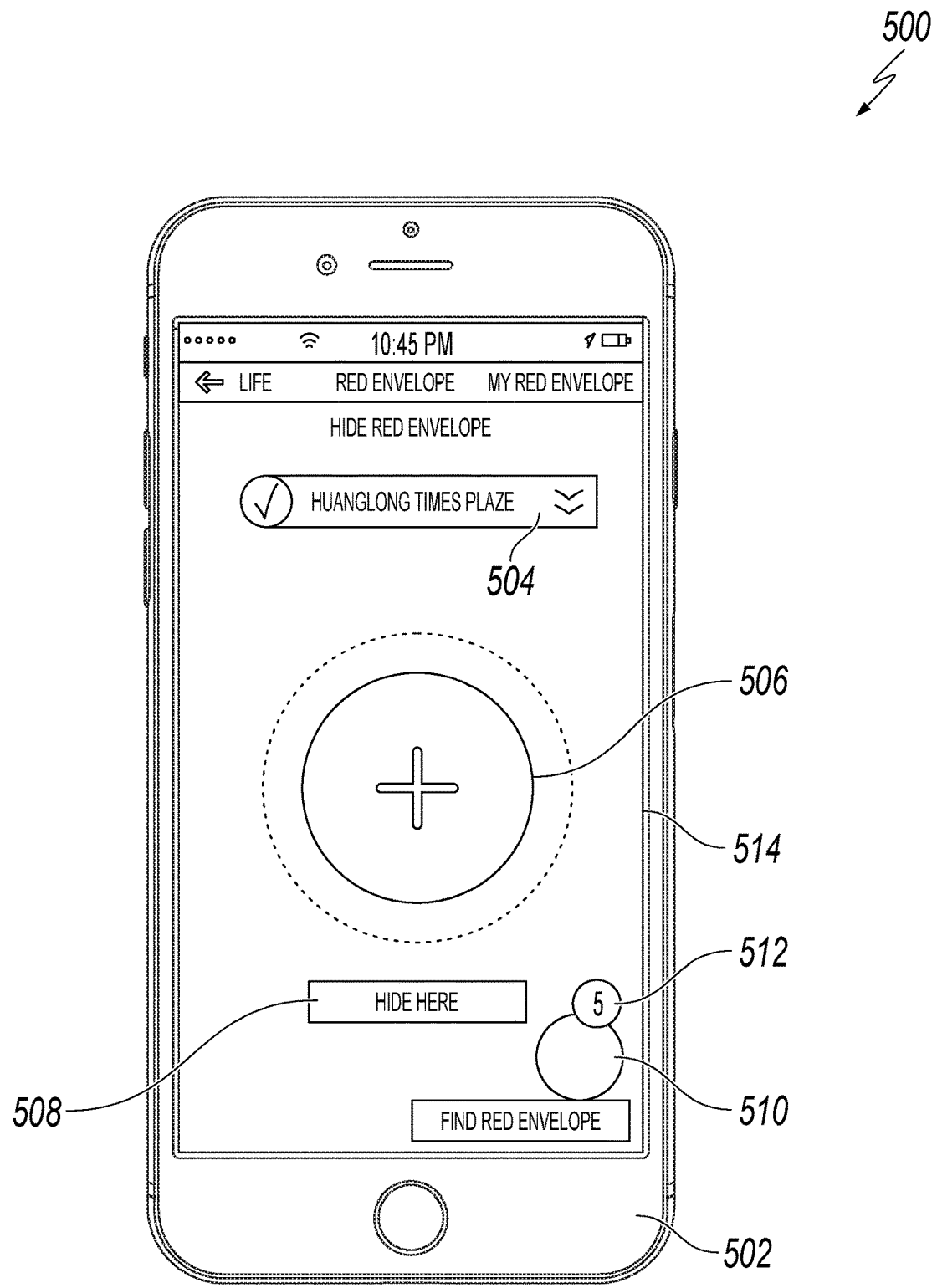
FIG. 5 is a schematic diagram illustrating a second example of a user interface for a distributing user to distribute virtual objects based on AR technologies, according to an implementation of the present disclosure.

FIG. 5 is a schematic diagram illustrating a second example of a user interface 500 for a distributing user to distribute virtual objects based on AR technologies, according to an implementation of the present disclosure. The user interface 500 includes a virtual object binding page 514 displayed by the distributing user's AR client terminal 502. Similar to the binding page 416, after determining the location of the distributing user, the AR client terminal 502 displays the location of the distributing user "Huanglong Times Plaza" in the text box 504, and an image scanning prompt 506 is displayed for the distributing user to perform image scanning of surrounding environment of the current location. When one or more image objects are recognized from the image scanned by the AR client terminal 502, a dynamically rotating ring-shaped scanning box in the image scanning prompt 506 may stop rotating, and at the same time, a "hide here" function button 508 (which is equivalent to the "confirm binding" user option) is output in the binding page 514. The distributing user can select the "hide here" function button 508 to enter a configuration interface for "hiding" red envelopes at the current location.

In some implementations, after the distributing user selects the "confirm binding" user option or the "hide here" function button 508, the distributing user's AR client terminal can send a configuration interface (or a configuration page) requesting message to the server terminal. After receiving the message, the server terminal can send information of the configuration interface to the AR client terminal. The AR client terminal can display the configuration interface for the distributing user to enter distribution information for red envelopes and hide the red envelopes at the current location (that is, bind the red envelopes to the current location).

The distribution information can include the number of red envelopes (for example, the first 10 users receive the red envelope), the cash amount for the red envelopes (for example, each red envelope has a certain cash value), the target population for receiving the red envelopes (for example, the red envelopes are for the distributing user's friends only), reserved information or text entered by the distributing user, and other information related to the distribution of the red envelopes. The configuration interface can provide fields for inputting the distribution information. The configuration interface can also provide predefined target populations related to red envelope distribution for the distributing user to choose from.

Figure 6:
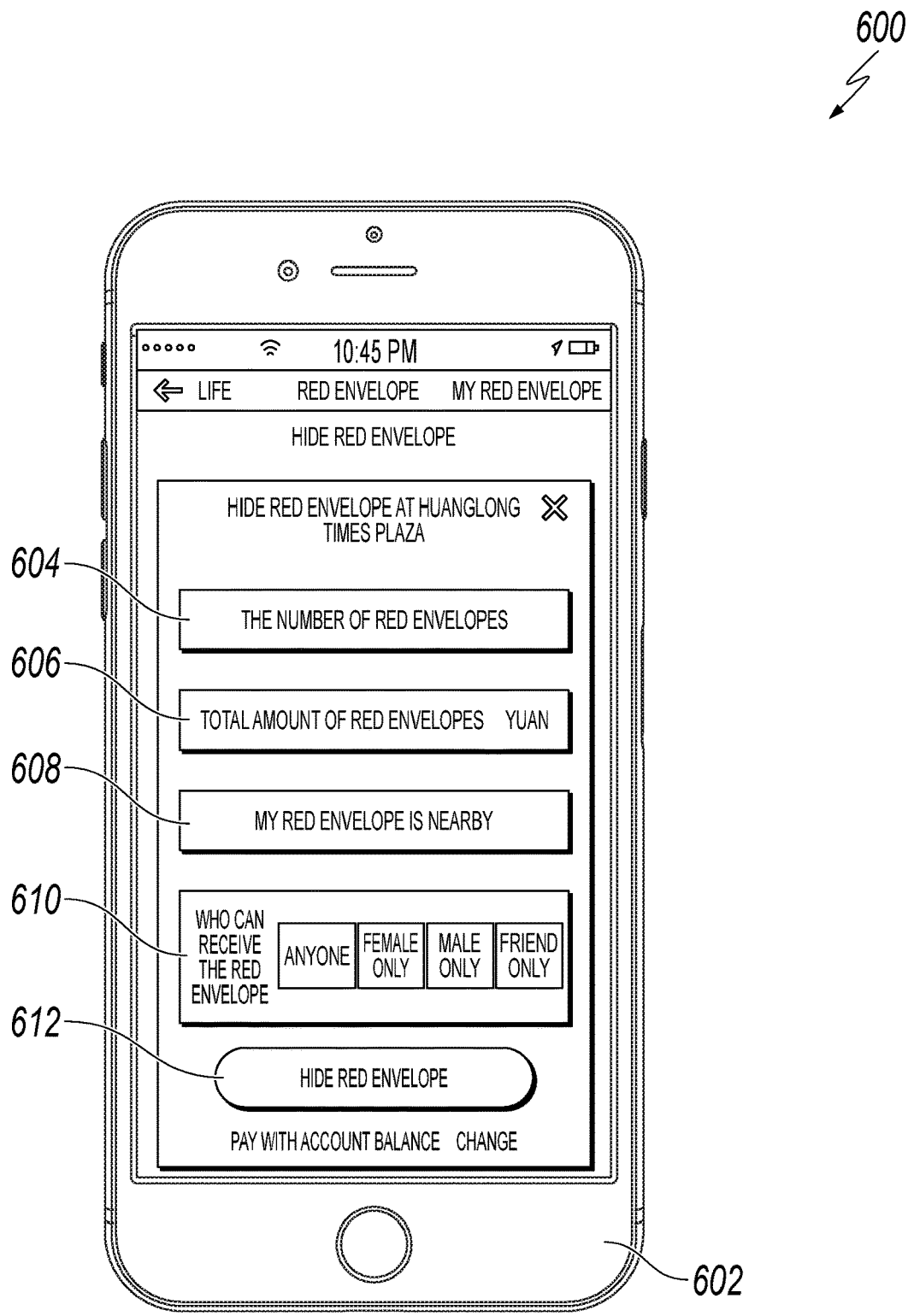
FIG. 6 is a schematic diagram illustrating an example of a configuration interface, according to an implementation of the present disclosure.

FIG. 6 is a schematic diagram illustrating an example of a configuration interface 600, according to an implementation of the present disclosure. The configuration interface 600 is displayed by the distributing user's AR client terminal 602. The configuration interface 600 includes input fields for the distributing user to enter distribution information for the red envelopes, for example, a number of red envelopes 604, a total cash amount for red envelopes 606, reserved information or text 608, and a target population 610 for receiving the red envelopes (for example, who can receive the red envelopes). The reserved information or text 608 can include the text that can be displayed to the receiving user when the receiving user finds the red envelope. The target population 610 can include predefined target populations, for example, "anyone", "male only", "female only", and "friend only". For example, in the configuration interface 600, the distributing user can enter the cash amount and the number of red envelopes to be "hidden" at the current location "Huanglong Times Plaza", the reserved text for the receiving users, and the target population for receiving the red envelopes. After entering the distribution information for the red envelopes, the user can click, tap, or perform other gestures on a "hide red envelope" function button 612 to confirm the configuration. Upon selecting the "hide red envelope" function button 612, the AR client terminal 602 can display a payment interface for the distributing user to select a payment method and complete payment for the red envelopes.

In some cases, after the distributing user completes the payment for the red envelopes, the AR client terminal 602 uploads the distribution information of the red envelopes to the server terminal. After receiving the uploaded distribution information, the server terminal can store the received distribution information. The server terminal establishes a binding relationship among the preset bound target (for example, an image object recognized from the scanned image of the distributing user's surrounding environment), the red envelopes "hidden" by the distributing user (the distribution information of the red envelopes), and the location where the distributing user hides the red envelopes.

After establishing the binding relationship, the server terminal can send a notification message to the AR client terminal 602 indicating that the red envelopes have been successfully bound with the preset bound target and the corresponding location. After receiving the notification message, the AR client terminal 602 can display a user interface (for example, as in FIG. 7) including a text prompt indicating that the red envelopes have been successfully bound, as well as a sharing option for notifying receiving users for the red envelopes.

Figure 7:
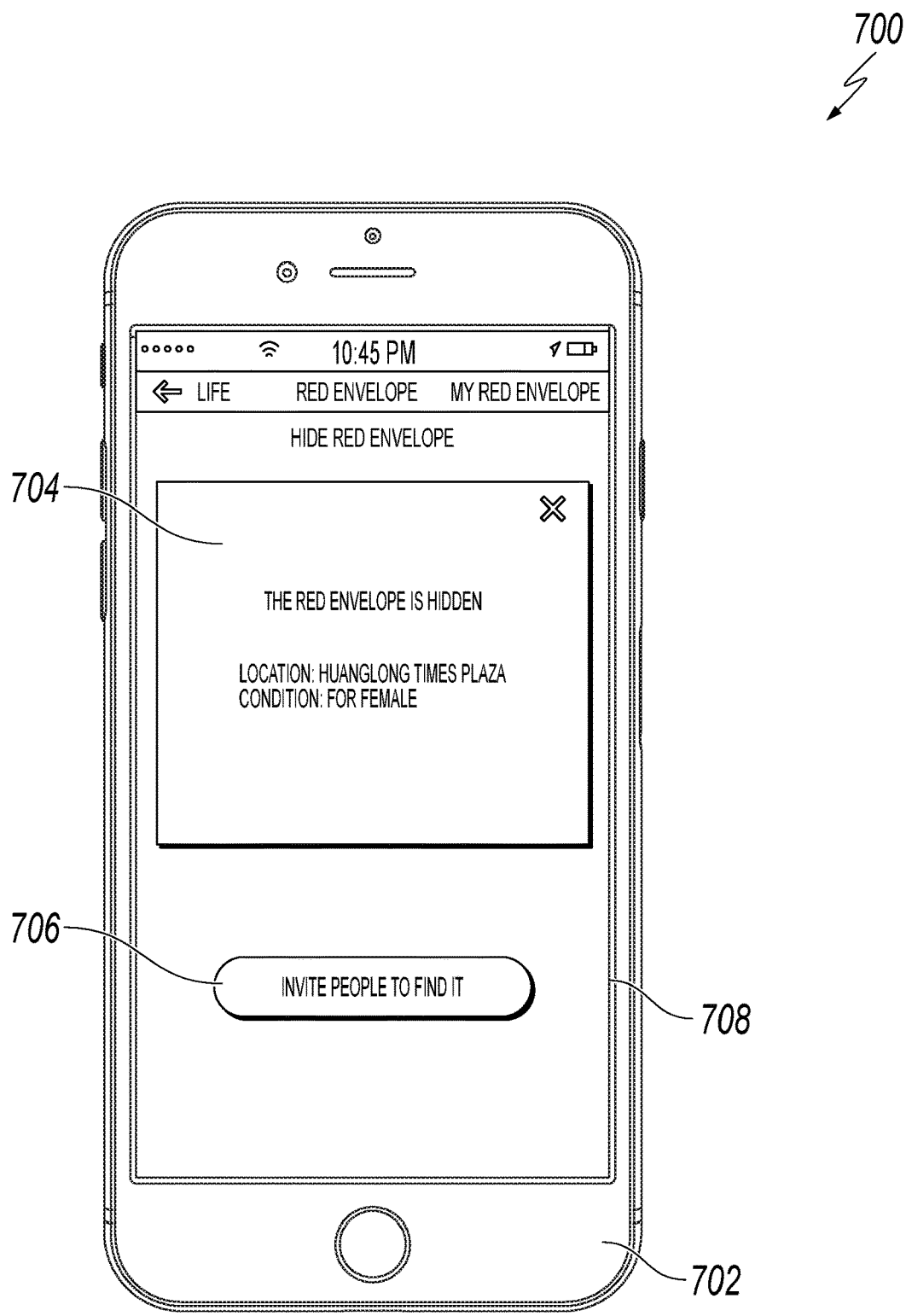
FIG. 7 is a schematic diagram illustrating a third example of a user interface for a distributing user to distribute virtual objects based on AR technologies, according to an implementation of the present disclosure.

FIG. 7 is a schematic diagram illustrating a third example of a user interface 700 for a distributing user to distribute virtual objects based on AR technologies, according to an implementation of the present disclosure. The user interface 700 includes a virtual object binding page 708 displayed by the distributing user's AR client terminal 702. For example, after the distributing user enters the distribution information of the red envelopes (for instance, specifying the target population for receiving the red envelope to be "female only") on the configuration interface in FIG. 6, the AR client terminal 702 can display the binding page 708 including a text prompt 704 of "The red envelope is hidden; location: Huanglong Times Plaza; condition: for female" and a sharing function button 706 of "invite people to find it".

Upon the distributing user selecting the sharing function button 706, the AR client terminal 702 can display a "share to friends" sub-interface (or a sharing page), and one or more preset applications can be presented in the sub-interface. The distributing user can select contacts from the preset applications for receiving the red envelopes. The distributing user can select an application in the sub-interface, wake up the application, select contact(s) in the application whom the distributing user would like to receive the red envelope, and then send the information of the "hidden" red envelope (for example, the location of the red envelope) as well as an image scanning clue (for example, the preset bound target) to the contact(s). The image scanning clue is used to help a receiving user to find where the red envelope is hidden. In some cases, information of the contacts that the distributing user selected for receiving the red envelopes is also sent to the server terminal, so that the server terminal has knowledge of the red envelopes that a user has been invited to receive.

In some cases, a user can be both a distributing user hiding red envelopes and a receiving user receiving red envelopes from other users. For example, in FIG. 3, a user can use "hide red envelope" option 304 to hide red envelopes and use "find red envelope" option 306 to find a red envelope from another user. For example, when a user selects "find red envelope" option 306, the user's AR client terminal can display a live map to guide the user to find red envelopes. In some cases, the user's AR client terminal can send a live map acquisition request to the server terminal, where the acquisition request carries the current location of the user. After receiving the acquisition request, the server terminal can send live map data corresponding to the user's current location to the user's AR client terminal.

In some cases, the server terminal has location information of all or a subset of the red envelopes that a receiving user can receive. The server terminal can further mark, in the live map data, the target locations where the receiving user can receive red envelopes, and send the live map data with marks to the receiving user's AR client terminal. After receiving the live map data, the AR client terminal can render the live map to the receiving user in the AR scene. For better guidance of the receiving user to find a target location of a "hidden" red envelope, the live map can also display a navigation prompt indicating the current location of the receiving user.

In some cases, the AR scene can be a virtual scene simulated in a user interface by the AR client terminal. When receiving the live map data from the server terminal, the AR client terminal can display the live map in the simulated virtual scene. The navigation prompt (such as, an arrow) can be rendered in the virtual scene, guiding the receiving user to go to a target location where a red envelope is "hidden".

Figure 8:
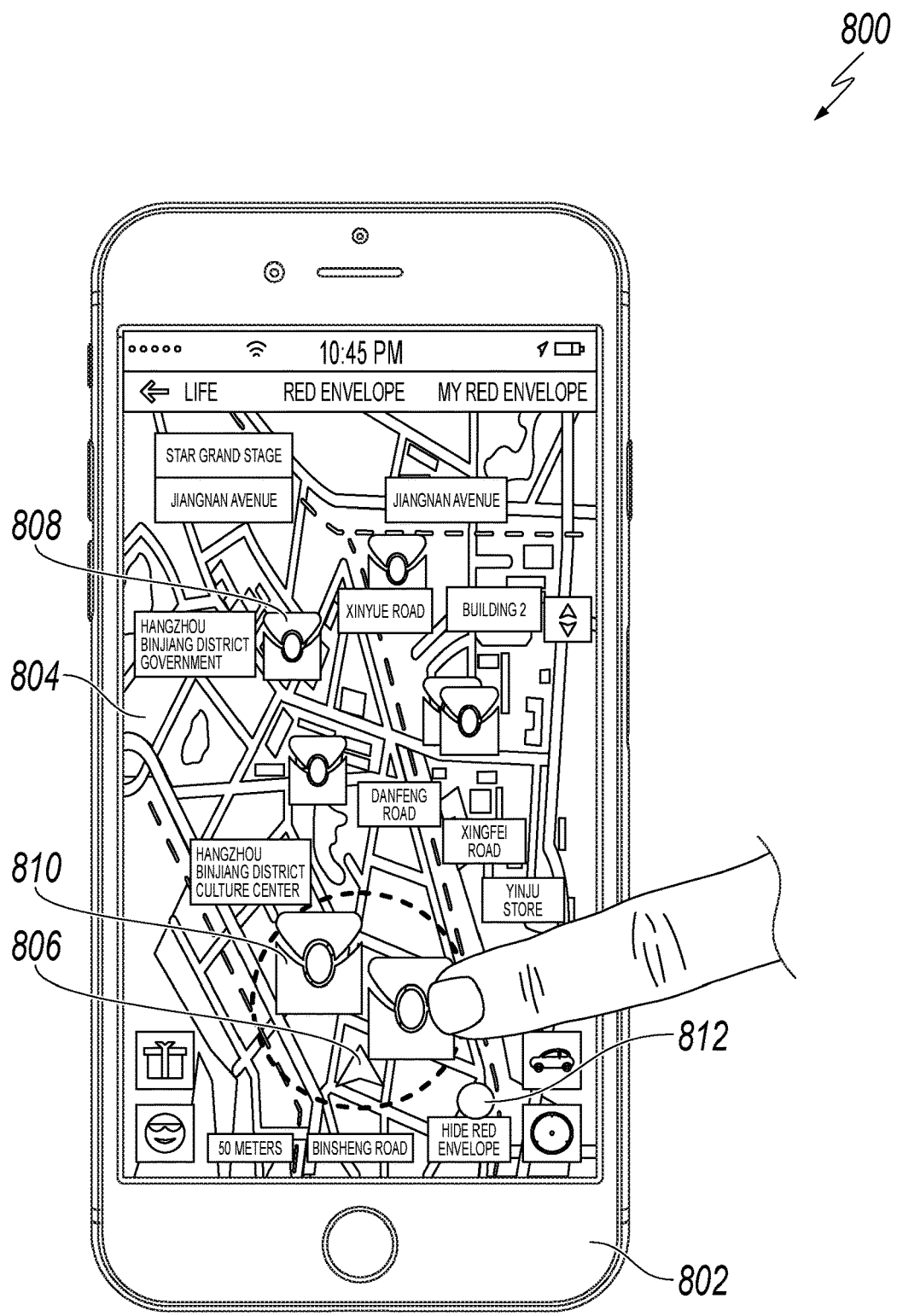
FIG. 8 is a schematic diagram illustrating a first example of a user interface for a receiving user to find and receive virtual objects based on AR technologies, according to an implementation of the present disclosure.

FIG. 8 is a schematic diagram illustrating a first example of a user interface 800 for a receiving user to find and receive virtual objects based on AR technologies, according to an implementation of the present disclosure. In some implementations, the user interface 800 is displayed by the receiving user's AR client terminal 802. As shown in FIG. 8, the user interface 800 can be a "find red envelope" interface. After receiving the live map data from the server terminal, the AR client terminal 802 can display a live "red envelope map" 804 in the "find red envelope" interface 800, marking target locations where red envelopes are "hidden" by other users in the red envelope map 804. The target locations can be marked using cue marks, for example, graphical identifiers 808 and 810 shaped like a red envelope. The AR client terminal 802 can also display an indicator 806 (for example, a direction indicating arrow) indicating the current location of the receiving user. The AR client terminal 802 can update the indicator 806 in real time as the receiving user moves. The live map 804 guides the receiving user to go to a target location to receive a "hidden" red envelope.

In some implementations, the AR client terminal 802 can classify a target location with "hidden" red envelopes into two classes, "attainable" and "unattainable". For example, the AR client terminal 802 can calculate in real time a distance between a target location and the current location of the receiving user. The target location is classified as "attainable" if the distance is below a threshold, and classified as "unattainable" if the distance exceeds the threshold. For helping the receiving user to find the red envelopes nearby, the AR client terminal 802 can use different cue marks for attainable and unattainable target locations in the live map 804. In some implementations, the location cue mark of an attainable target location can be highlighted or enlarged. For example, a large cue mark 810 is used for an attainable target location and a small cue mark 808 for an unattainable target location. In some implementations, only attainable target locations are marked, while unattainable target locations are not marked in the live map 804. In some implementations, the location cue mark also includes information of the distributing user who "hides" the red envelope. For example, the location cue marks 808 or 810 can also include an avatar or a profile image of the distributing user who hides the red envelope. In some cases, only the cue marks for the attainable target locations (such as, the cue mark 810) include an avatar or a profile image of the distributing user.

Under the guidance of the live map, when the receiving user approaches a target location where a red envelope is "hidden", the receiving user can perform a gesture or an operation on or near the corresponding cue mark, and enter a virtual object searching page (for example, a red envelope search page) as shown in FIG. 9. In some cases, after the receiving user performs a gesture on the cue mark of a particular target location, the AR client terminal can determine if the distance between the particular target location and the receiving user's current location is less than a threshold. If the distance is below the threshold, the AR client terminal can display the red envelope search page in FIG. 9. In some cases, if the user is not close enough to the target location for displaying the red envelope search page, the AR client terminal can display a prompt message in the live map, indicating that the user is too far from the red envelope. For example, the prompt message can be a text prompt of "You are too far away from the red envelope. Please move closer to receive it." The prompt message can also indicate the distance to the target location. The threshold for displaying the red envelope search page and the threshold for classifying as an attainable target location can be the same or different. For example, a target location within 500 meters from the receiving user's current location is classified as attainable, and the AR client terminal does not display the red envelope search page until the receiving user is within 50 meters from the target location.

FIG. 9 is a schematic diagram illustrating a second example of a user interface 900 for a receiving user to find and receive virtual objects based on AR technologies, according to an implementation of the present disclosure. The user interface 900 can include a red envelope searching page 904 displayed by the receiving user's AR client terminal 902. The red envelope searching page 904 can include an avatar 906 or user name of the distributing user who hides the red envelope. The red envelope searching page 904 can also include reserved text 908, for example, "Can't find the red envelope? Ask me." In some cases, the reserved text 908 is same as the text entered by the distributing user in the input field 608 of the configuration interface 600 when the distributing user hid the red envelope. In some implementations, when initiating to display the red envelope searching page 904, the AR client terminal 902 can query the server terminal for the information of the distributing user (such as, the avatar or the use name) as well as the reserved text input by the distributing user.

The red envelope searching page 904 can also include an image scanning prompt 908. The receiving user uses the scanning prompt 910 to scan the surrounding environment, and send information of the scanned image to the server terminal. The server terminal can perform image recognition to identify one or more image objects in the scanned image. In some cases, the AR client terminal can perform image recognition to identify the image object(s). If one, all, or a subset of the identified image object(s) match the preset bound target associated with the red envelope, the receiving user can receive the red envelope. For example, if the preset bound target includes one or more image objects, the identified image object(s) can be considered to match the preset bound target if one of the identified image object(s) matches one image object of the preset bound target.

For increasing the chance that the image scanned by the receiving user includes the preset bound target, an image scanning clue can be provided to the receiving user. A function button 912 for presenting an image scanning clue can be included in the red envelope searching page 904. Upon detecting a selection on the function button 912, the AR client terminal 902 can query the server terminal for an image scanning clue, and display the received image scanning clue in the red envelope searching page 904. In some cases, the scanning image clue can be a clue image, for example, the image of the surrounding environment scanned by the distributing user at the target location when the distributing user hid the red envelope. In some cases, the scanning image clue can be the preset bound target associated with the target location. In some implementations, the distributing user can be explicitly asked to take a picture of the surrounding environment and upload the picture to the server terminal to serve as a clue image.

After viewing the image scanning clue, the receiving user can use the image scanning prompt 910 to scan an image (or take a picture) of the surrounding environment which has similar image contents or objects as the image scanning clue. For example, if the image scanning clue includes a particular store's logo, the receiving user can find that logo in the surrounding environment and take a picture. The AR client terminal can initiate image recognition on the scanned image. As discussed previously, the AR client terminal or the server terminal can perform the image recognition to recognize the image objects or image contents in the scanned image. The server terminal can determine if the recognized image objects or contents from the image scanned by the receiving user match the preset bound target associated with the target location. If yes, the server terminal can further determine whether the receiving user matches the target population that the distributing user specified for receiving the red envelope. For example, the server terminal can have each user's information. If the distributing user specifies the target population of "friend only" and the receiving user is not a contact of the distributing user in the social applications the distributing user uses, then the server terminal does not distribute the red envelope to the receiving user even if the receiving user has found the target location.

If the receiving user matches the target population and the total number of red envelopes specified by the distributing user has not been exceeded, the server terminal can distribute a red envelope to the receiving user. For example, the server terminal can transfer the amount of funds in the red envelope to the receiving user's account. In some cases, if the target user does not match the target population for receiving the red envelope, the AR client terminal can display a prompt indicating that the receiving user is not eligible for receiving the red envelope.

In some cases, instead of using the function button 912 to first ask for an image scanning clue, the receiving user may directly use the image scanning prompt 910 to scan the surrounding environment. If the time duration for the receiving user to successfully scan an image of the surrounding environment exceeds a threshold time, the AR client terminal can automatically query the server terminal for an image scanning clue and display the clue to the receiving user. In some implementations, if the time duration for the receiving user to successfully scan an image exceeds a threshold time, the AR client terminal can output an "ask for clue" function button 914 (or a session entry option) in the red envelope searching page 904. For example, the "ask for clue" function button 914 can be displayed near the displayed avatar or user name of the distributing user who hid the red envelope. When the receiving user selects the function button 914, the AR client terminal can query the server terminal for an image scanning clue. In some cases, upon the receiving user selecting the function button 914, the AR client terminal can enter a session page so that the receiving user can send a message (such as, a private message or a real-time instant communication message) to the distributing user asking for the image scanning clue. In some implementations, an image is successfully scanned if an image recognition algorithm can successfully recognize one or more image objects or contents in the scanned image, or the quality or the resolution of the scanned image exceeds a threshold.

In some implementations, a user can enter a red envelope binding page to hide a new red envelope during searching for a red envelope. For example, in the live map in FIG. 8, the AR client terminal can include a function button 812 for entering the virtual object binding page in FIG. 5. Similarly, after "hiding" the red envelope, a user can enter a live map to search for red envelopes hidden nearby by other users. For example, the virtual object binding page in FIG. 5 can include a function button 510 for entering the "find red envelope" interface in FIG. 8.

In some implementations, for helping a user to find the red envelopes nearby, the AR client terminal can indicate the number of red envelopes that are within a threshold distance from the user's current location. For example, in FIG. 3, a number indicator 308 is displayed to indicate the number of attainable red envelopes (for example, five attainable red envelopes). Similarly, in FIG. 5, a number indicator 512 indicates the number of attainable red envelopes.

Figure 10:
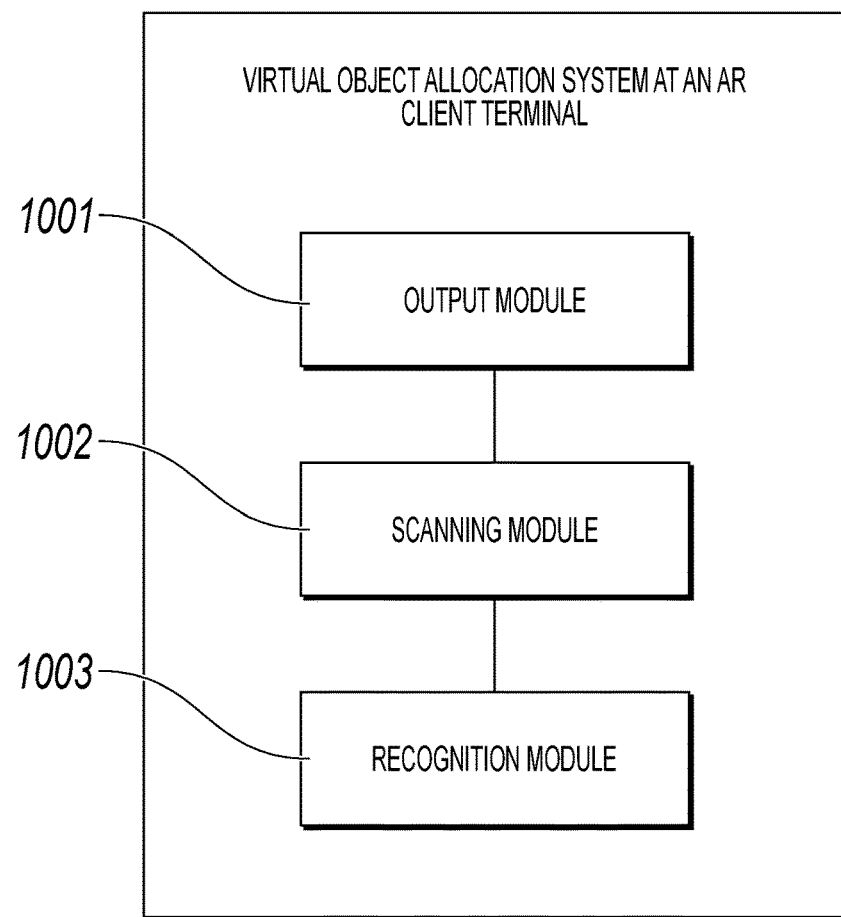
FIG. 10 is a block diagram illustrating an example of a system at an AR client terminal for allocation of virtual objects based on AR, according to an implementation of the present disclosure.

FIG. 10 is a block diagram illustrating an example of a system 1000 at an AR client terminal for allocation of virtual objects based on AR, according to an implementation of the present disclosure. The system 1000 can include an output module 1001, a scanning module 1002, and a recognition module 1003. The system 1000 can be implemented in software, hardware, or a combination of software and hardware.

The output module 1001 is configured to output, in an AR scene, a live map corresponding to a location of a receiving user according to live map data returned by a server terminal, where the live map includes target locations to which virtual objects are bound by other users in advance. The scanning module 1002 is configured to perform, in response to an image scanning operation performed by the receiving user at a target location to which a virtual object is bound, real-time image scanning on a surrounding environment of the target location. The recognition module 1003 is configured to initiate image recognition for the scanned image information, and when a preset bound target is recognized from the image information, receive a virtual object allocated by the server terminal. The preset bound target can include an image object which is scanned from the surrounding environment of the target location when a distributing user binds the virtual object to the target location.

In some implementations, the output module 1001 is configured to: send a live map acquisition request to the server terminal, where the live map acquisition request carries the location of a receiving user; receive the live map data corresponding to the location of the receiving user from the server terminal, where target locations to which the virtual objects are bound by other users in advance are pre-marked in the live map data; and output the live map in the AR scene based on the received live map data.

In some implementations, the output module 1001 is further configured to: output, in the live map, a navigation prompt corresponding to the location of the receiving user for guiding the receiving user to go to the target location to which the virtual object is bound in advance.

In some implementations, the output module 1001 is further configured to: calculate in real time a distance between the location of the receiving user and each target location; and add a corresponding location cue mark to a target location whose distance to the location of the receiving user is less than a preset threshold.

In some implementations, the output module 1001 is further configured to: highlight a location cue mark of a target location whose distance to the location of the receiving user is less than a preset threshold, if corresponding location cue marks are added to all the target locations in the live map.

In some implementations, the scanning module 1002 is further configured to: determine whether a distance between the target location and the location of the receiving user is less than a preset threshold; enter a virtual object searching page corresponding to the target location if the distance between the target location and the location of the receiving user is less than the preset threshold; and output an image scanning prompt in the virtual object searching page for prompting the receiving user to perform real-time image scanning on the surrounding environment of the target location.

In some implementations, the output module 1001 is further configured to output, in the virtual object searching page, related information of the distributing user who binds the virtual object to the target location.

In some implementations, the output module 1001 is further configured to: output, in the virtual object searching page, an interaction option for presenting an image scanning clue; and output a clue image at a preset position in the virtual object searching page in response to a trigger operation on the interaction option by a user, where the clue image includes image information which is scanned when the distributing user binds the virtual object to the target location.

In some implementations, the output module 1001 is further configured to: output a session entry option corresponding to the distributing user in the virtual object searching page if the virtual object is still not successfully allocated when an image scanning duration reaches a preset duration; and enter a session page corresponding to the distributing user in response to a trigger operation on the session entry option by the receiving user.

In some implementations, the output module 1001 is further configured to: output an image scanning prompt in a virtual object binding page corresponding to the location of the distributing user for prompting the distributing user to perform real-time image scanning on the surrounding environment.

In some implementations, the recognition module 1003 is further configured to: initiate image recognition for scanned image information, and when a bound target is successfully recognized from the image information, output a configuration interface which is returned by the server terminal and used for binding a virtual object to the location.

The system 1000 can further include an acquisition module (not shown in FIG. 10). The acquisition module is configured to acquire virtual object distribution information input by the distributing user in the configuration interface, and upload the acquired distribution information and the location to the server terminal, so that the server terminal establishes a binding relationship between the recognized bound target (that is, preset bound target) and the virtual object.

In some implementations, the recognition module 1003 is further configured to: initiate image recognition for the scanned image information based on a local image recognition model, and upload a recognition result to the server terminal; or upload the scanned image information to the server terminal, so that the server terminal performs image recognition on the image information based on a local image recognition model thereof, and receive a recognition result from the server terminal.

In some implementations, the live map includes a page entry for entering the virtual object binding page; and the virtual object binding page includes a page entry for entering the live map.

In some implementations, the output module 1001 is further configured to: output, in the virtual object binding page and in response to a notification message returned by the server terminal indicating that the virtual object is successfully bound, a sharing option corresponding to the virtual object; and enter a sharing page corresponding to the virtual object in response to a trigger operation on the sharing option by the distributing user.

Figure 11:
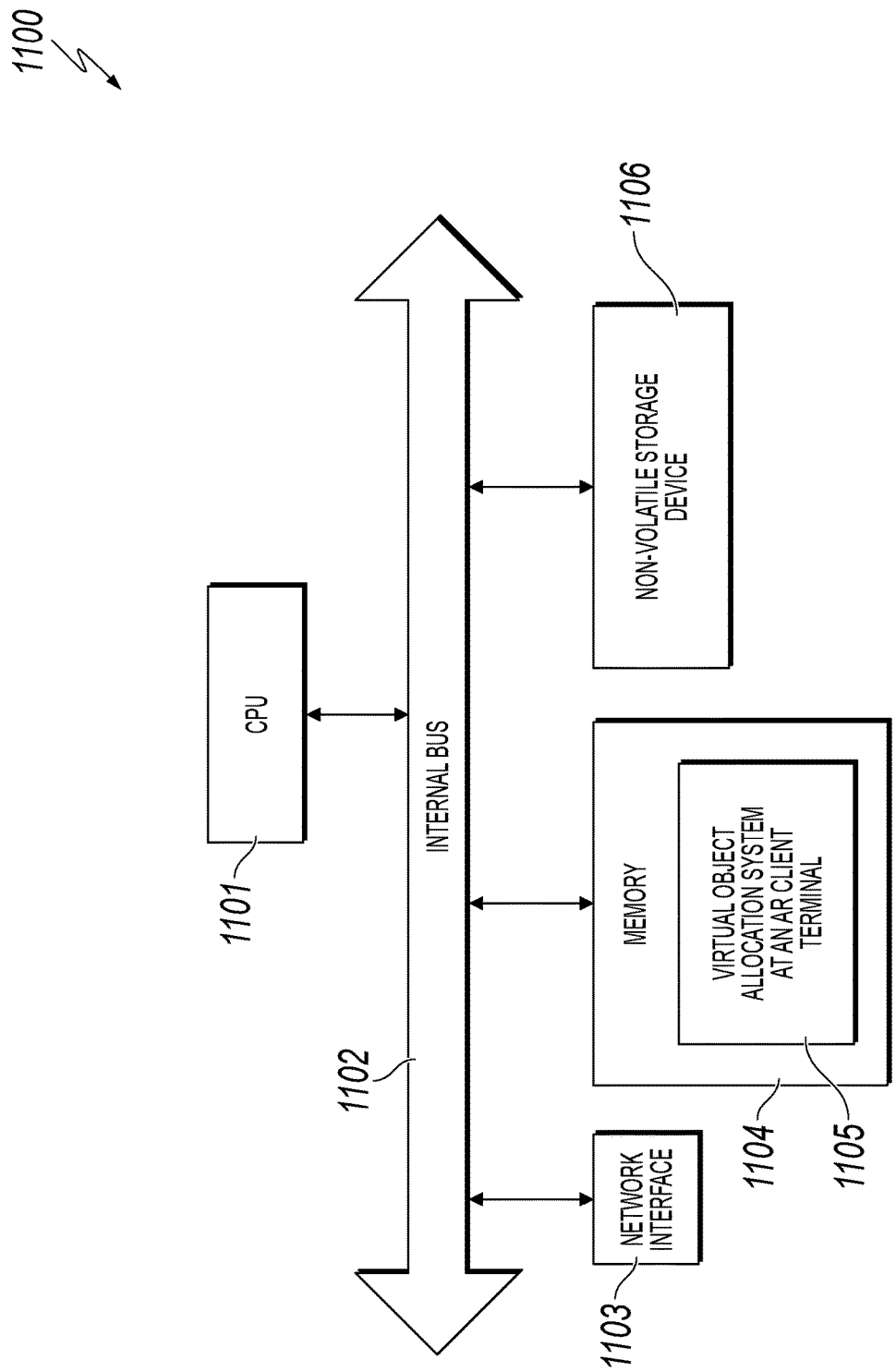
FIG. 11 is a block diagram illustrating an example of a hardware architecture at an AR client terminal for allocation of virtual objects based on AR, according to an implementation of the present disclosure.

FIG. 11 is a block diagram illustrating an example of a hardware architecture 1100 at an AR client terminal for allocation of virtual objects based on AR, according to an implementation of the present disclosure. The hardware architecture 1100 can include a CPU 1101, a network interface 1103, a memory 1104, and a non-volatile storage device 1106. The hardware architecture 1100 also includes an internal bus 1102 connecting the CPU 1101, the network interface 1103, the memory 1104, and the non-volatile storage device 1106. The memory 1104 can include a virtual object allocation system 1105. The system 1105 can be the system 1000 in FIG. 10. In an example of software implementation, the virtual object allocation system 1105 can be a software-hardware-combined logic system which is formed after the CPU 1101 runs a computer program loaded in the memory 1104.

Figure 12:
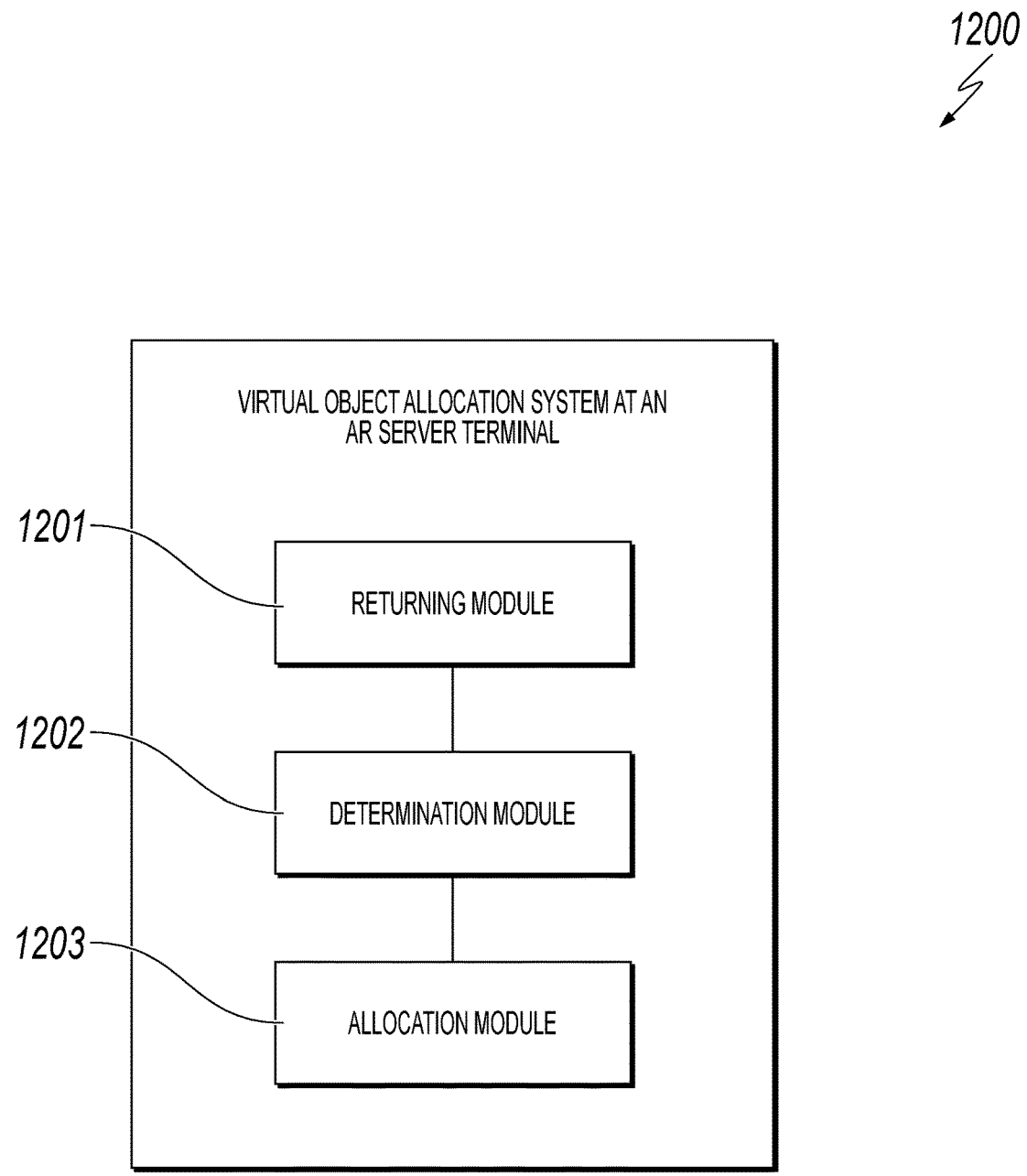
FIG. 12 is a block diagram illustrating an example of a system at a server terminal for allocation of virtual objects based on AR, according to an implementation of the present disclosure.

FIG. 12 is a block diagram illustrating an example of a system 1200 at a server terminal for allocation of virtual objects based on AR, according to an implementation of the present disclosure. The system 1200 can include a returning module 1201, a determining module 1202, and an allocation module 1203. The system 1200 can be implemented in software, hardware, or a combination of software and hardware.

The returning module 1201 is configured to return live map data corresponding to a location of a receiving user to an AR client terminal, so that the AR client terminal outputs a live map in an AR scene, where the live map includes target locations to which virtual objects are bound by other users in advance. The determination module 1202 is configured to determine, in response to an image scanning operation of the receiving user for a surrounding environment of a target location to which a virtual object is bound, whether a preset bound target is recognized from image information scanned by the receiving user's AR client terminal. The allocation module 1203 is configured to allocate a virtual object to the receiving user if the preset bound target is recognized from the image information scanned by the receiving user, where the preset bound target includes a bound target which is scanned from the surrounding environment of the target location when the distributing user binds the virtual object to the target location.

In some implementations, the determination module 1202 is further configured to: determine whether the preset bound target is recognized from the image information scanned by the distributing user's AR client terminal, when the distributing user enters a virtual object binding page corresponding to the location of the distributing user and performs real-time image scanning on the surrounding environment of the location through the virtual object binding page.

The returning module 1201 is further configured to: return, to the distributing user's AR client terminal if the preset bound target is recognized from the image information scanned by the distributing user, a configuration interface for binding a virtual object to the location.

The system 1200 can further include a receiving module and an establishment module (not shown in FIG. 12). The receiving module is configured to receive and save the location of the distributing user uploaded by the distributing user's AR client terminal, and virtual object allocation information input by the distributing user in the configuration interface. The establishment module is configured to establish a binding relationship between the preset bound target and the virtual object.

In some implementations, the returning module 1201 is configured to: receive a live map acquisition request sent by the receiving user's AR client terminal, where the live map acquisition request carries the location of the receiving user; search for the live map data corresponding to the location of the receiving user in response to the received live map acquisition request, and mark, in the found live map data, target locations to which virtual objects are bound by other users in advance; and return the found live map data to the receiving user's AR client terminal.

In some implementations, the allocation information includes a target population of allocation specified by the distributing user in the configuration page. The allocation module 1203 is configured to: determine whether the receiving user matches a target population of allocation that is specified when the distributing user binds the virtual object to the target location; and allocate the virtual object to the receiving user if the receiving user matches the target population of allocation.

Figure 13:
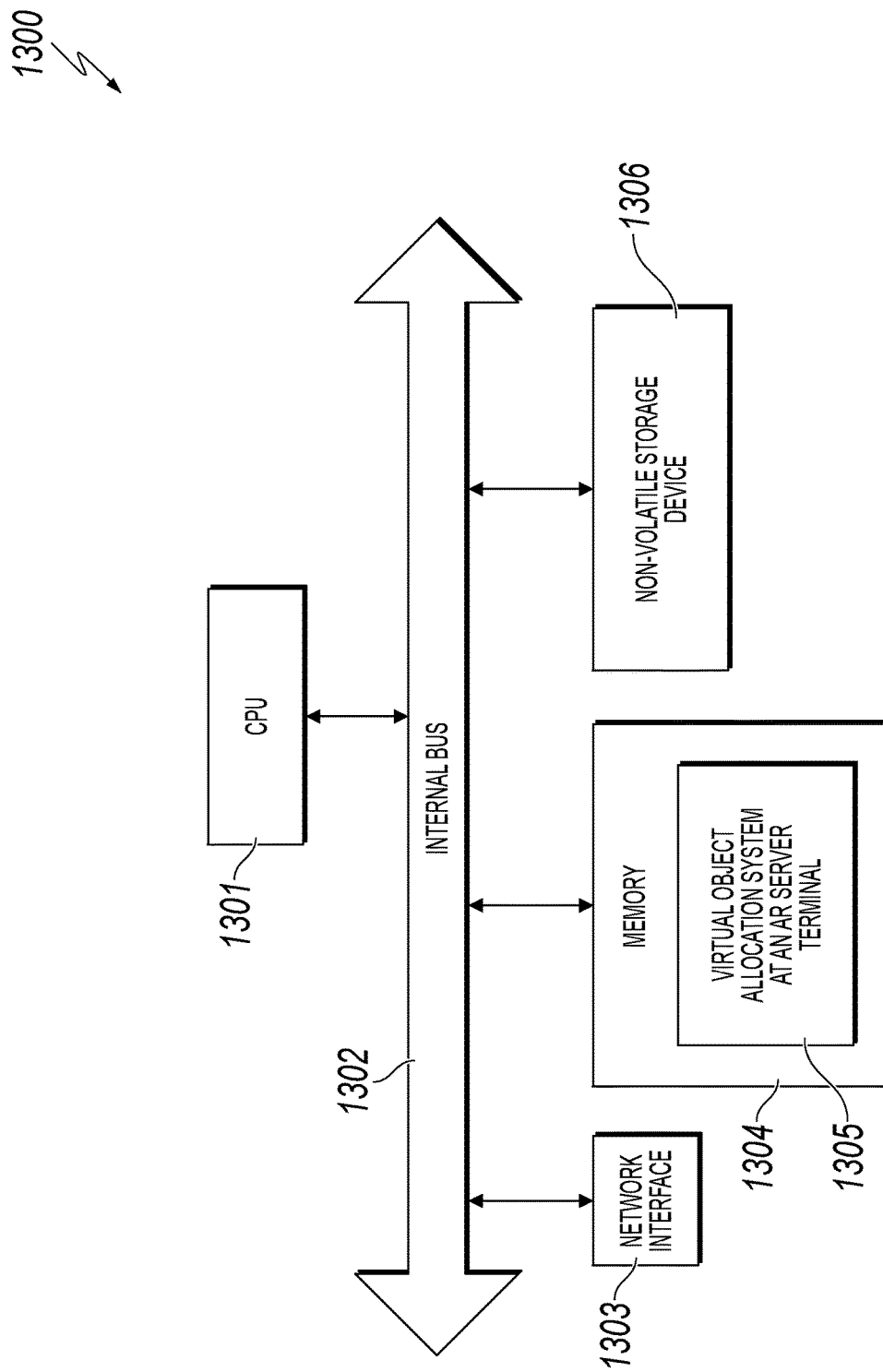
FIG. 13 is a block diagram illustrating an example of a hardware architecture at a server terminal for allocation of virtual objects based on AR, according to an implementation of the present disclosure.

FIG. 13 is a block diagram illustrating an example of a hardware architecture 1300 at a server terminal for allocation of virtual objects based on AR, according to an implementation of the present disclosure. The hardware architecture 1300 can include a CPU 1301, a network interface 1303, a memory 1304, and a non-volatile storage device 1306. The hardware architecture 1300 also includes an internal bus 1302 connecting the CPU 1301, the network interface 1303, the memory 1304, and the non-volatile storage device 1306. The memory 1304 can include a virtual object allocation system 1305. The system 1305 can be the system 1200 in FIG. 12. In an example of software implementation, the virtual object allocation system 1305 can be a software-hardware-combined logic system which is formed after the CPU 1301 runs a computer program loaded in the memory 1304.

Figure 14:
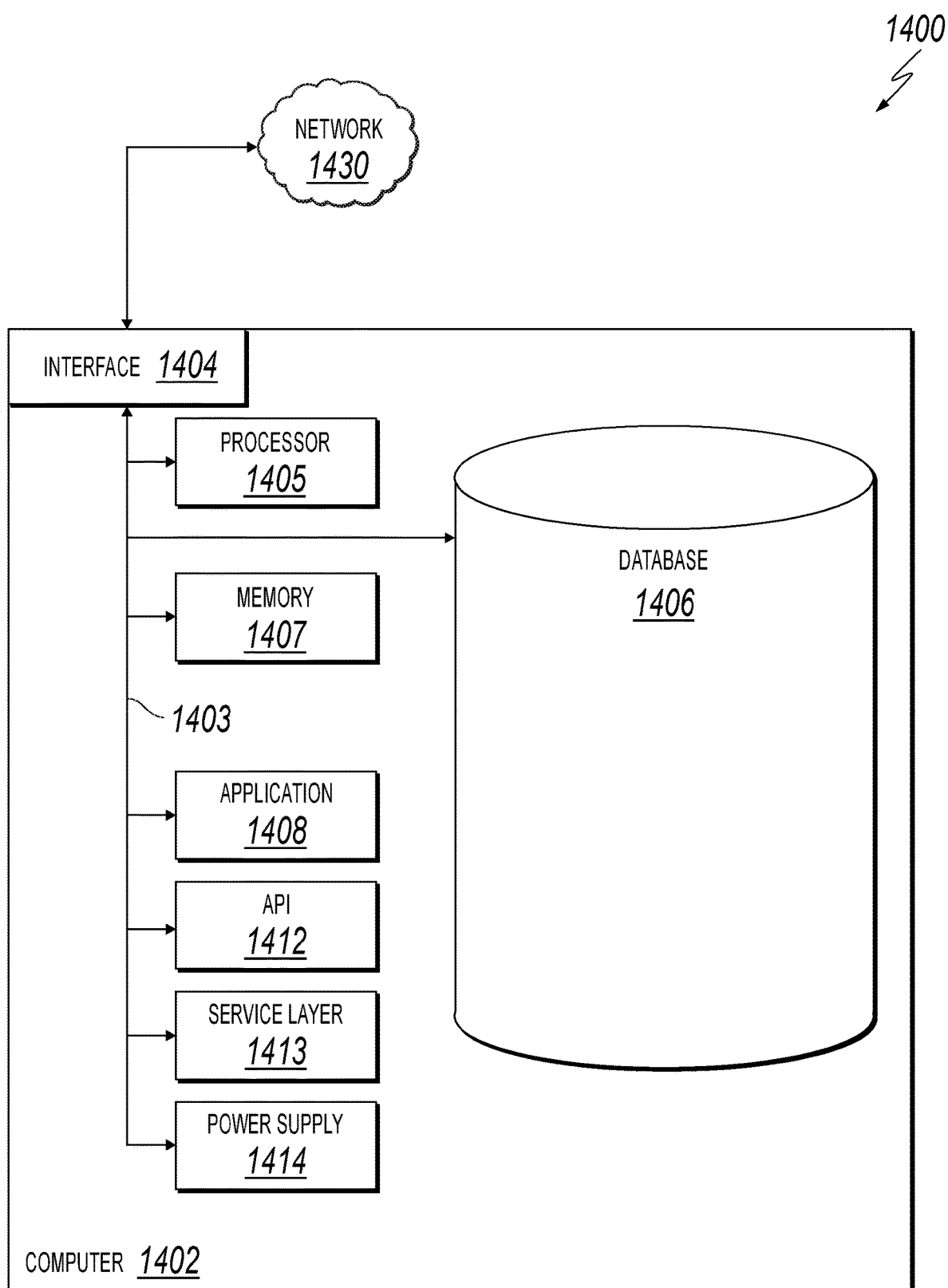
FIG. 14 is a block diagram illustrating an example of a computer-implemented system used to provide computational functionalities associated with described algorithms, methods, functions, processes, flows, and procedures, according to an implementation of the present disclosure.

FIG. 14 is a block diagram illustrating an example of a computer-implemented System 1400 used to provide computational functionalities associated with described algorithms, methods, functions, processes, flows, and procedures, according to an implementation of the present disclosure. In the illustrated implementation, System 1400 includes a Computer 1402 and a Network 1430.

The illustrated Computer 1402 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the Computer 1402 can include an input device, such as a keypad, keyboard, touch screen, another input device, or a combination of input devices that can accept user information, and an output device that conveys information associated with the operation of the Computer 1402, including digital data, visual, audio, another type of information, or a combination of types of information, on a graphical-type user interface (UI) (or GUI) or other UI.

The Computer 1402 can serve in a role in a distributed computing system as a client, network component, a server, a database or another persistency, another role, or a combination of roles for performing the subject matter described in the present disclosure. The illustrated Computer 1402 is communicably coupled with a Network 1430. In some implementations, one or more components of the Computer 1402 can be configured to operate within an environment, including cloud-computing-based, local, global, another environment, or a combination of environments.

At a high level, the Computer 1402 is an electronic computing device operable to receive, transmit, process, store, or manage data and information associated with the described subject matter. According to some implementations, the Computer 1402 can also include or be communicably coupled with a server, including an application server, e-mail server, web server, caching server, streaming data server, another server, or a combination of servers.

The Computer 1402 can receive requests over Network 1430 (for example, from a client software application executing on another Computer 1402) and respond to the received requests by processing the received requests using a software application or a combination of software applications. In addition, requests can also be sent to the Computer 1402 from internal users (for example, from a command console or by another internal access method), external or third-parties, or other entities, individuals, systems, or computers.

Each of the components of the Computer 1402 can communicate using a System Bus 1403. In some implementations, any or all of the components of the Computer 1402, including hardware, software, or a combination of hardware and software, can interface over the System Bus 1403 using an application programming interface (API) 1412, a Service Layer 1413, or a combination of the API 1412 and Service Layer 1413. The API 1412 can include specifications for routines, data structures, and object classes. The API 1412 can be either computer-language independent or dependent and refer to a complete interface, a single function, or even a set of APIs. The Service Layer 1413 provides software services to the Computer 1402 or other components (whether illustrated or not) that are communicably coupled to the Computer 1402. The functionality of the Computer 1402 can be accessible for all service consumers using the Service Layer 1413. Software services, such as those provided by the Service Layer 1413, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the Computer 1402, alternative implementations can illustrate the API 1412 or the Service Layer 1413 as stand-alone components in relation to other components of the Computer 1402 or other components (whether illustrated or not) that are communicably coupled to the Computer 1402. Moreover, any or all parts of the API 1412 or the Service Layer 1413 can be implemented as a child or a sub-module of another software module, enterprise application, or hardware module without departing from the scope of the present disclosure.

The Computer 1402 includes an Interface 1404. Although illustrated as a single Interface 1404, two or more Interfaces 1404 can be used according to particular needs, desires, or particular implementations of the Computer 1402. The Interface 1404 is used by the Computer 1402 for communicating with another computing system (whether illustrated or not) that is communicatively linked to the Network 1430 in a distributed environment. Generally, the Interface 1404 is operable to communicate with the Network 1430 and includes logic encoded in software, hardware, or a combination of software and hardware. More specifically, the Interface 1404 can include software supporting one or more communication protocols associated with communications such that the Network 1430 or hardware of Interface 1404 is operable to communicate physical signals within and outside of the illustrated Computer 1402.

The Computer 1402 includes a Processor 1405. Although illustrated as a single Processor 1405, two or more Processors 1405 can be used according to particular needs, desires, or particular implementations of the Computer 1402. Generally, the Processor 1405 executes instructions and manipulates data to perform the operations of the Computer 1402 and any algorithms, methods, functions, processes, flows, and procedures as described in the present disclosure.

The Computer 1402 also includes a Database 1406 that can hold data for the Computer 1402, another component communicatively linked to the Network 1430 (whether illustrated or not), or a combination of the Computer 1402 and another component. For example, Database 1406 can be an in-memory, conventional, or another type of database storing data consistent with the present disclosure. In some implementations, Database 1406 can be a combination of two or more different database types (for example, a hybrid in-memory and conventional database) according to particular needs, desires, or particular implementations of the Computer 1402 and the described functionality. Although illustrated as a single Database 1406, two or more databases of similar or differing types can be used according to particular needs, desires, or particular implementations of the Computer 1402 and the described functionality. While Database 1406 is illustrated as an integral component of the Computer 1402, in alternative implementations, Database 1406 can be external to the Computer 1402.

The Computer 1402 also includes a Memory 1407 that can hold data for the Computer 1402, another component or components communicatively linked to the Network 1430 (whether illustrated or not), or a combination of the Computer 1402 and another component. Memory 1407 can store any data consistent with the present disclosure. In some implementations, Memory 1407 can be a combination of two or more different types of memory (for example, a combination of semiconductor and magnetic storage) according to particular needs, desires, or particular implementations of the Computer 1402 and the described functionality. Although illustrated as a single Memory 1407, two or more Memories 1407 or similar or differing types can be used according to particular needs, desires, or particular implementations of the Computer 1402 and the described functionality. While Memory 1407 is illustrated as an integral component of the Computer 1402, in alternative implementations, Memory 1407 can be external to the Computer 1402.

The Application 1408 is an algorithmic software engine providing functionality according to particular needs, desires, or particular implementations of the Computer 1402, particularly with respect to functionality described in the present disclosure. For example, Application 1408 can serve as one or more components, modules, or applications. Further, although illustrated as a single Application 1408, the Application 1408 can be implemented as multiple Applications 1408 on the Computer 1402. In addition, although illustrated as integral to the Computer 1402, in alternative implementations, the Application 1408 can be external to the Computer 1402.

The Computer 1402 can also include a Power Supply 1414. The Power Supply 1414 can include a rechargeable or non-rechargeable battery that can be configured to be either user- or non-user-replaceable. In some implementations, the Power Supply 1414 can include power-conversion or management circuits (including recharging, standby, or another power management functionality). In some implementations, the Power Supply 1414 can include a power plug to allow the Computer 1402 to be plugged into a wall socket or another power source to, for example, power the Computer 1402 or recharge a rechargeable battery.

There can be any number of Computers 1402 associated with, or external to, a computer system containing Computer 1402, each Computer 1402 communicating over Network 1430. Further, the term "client," "user," or other appropriate terminology can be used interchangeably, as appropriate, without departing from the scope of the present disclosure. Moreover, the present disclosure contemplates that many users can use one Computer 1402, or that one user can use multiple computers 1402.

Described implementations of the subject matter can include one or more features, alone or in combination.

For example, in a first implementation, a computer-implemented method, comprising: displaying, by an AR client terminal of a receiving user, a live map associated with a location of the receiving user, wherein the live map includes a target location to which a virtual object was bound by a distributing user; scanning, by the AR client terminal of the receiving user, an image of an environment of the target location; and in response to determining that the scanned image includes a preset bound target, receiving information of the virtual object from a server terminal, wherein the preset bound target is associated with the virtual object and the target location.

The foregoing and other described implementations can each, optionally, include one or more of the following features:

A first feature, combinable with any of the following features, wherein the distributing user binds the virtual object to the target location, and binding the virtual object to the target location comprises: displaying, by an AR client terminal of the distributing user, a virtual object binding page for the distributing user to bind the virtual object to the target location; scanning, by the AR client terminal of the distributing user, a second image of the environment of the target location; determining a bound target from the second image; assigning the determined bound target as the preset bound target; receiving distribution information of the virtual object based on the distributing user's input; and uploading, to the server terminal, the distribution information of the virtual object, information of the preset bound target, and information of the target location.

A second feature, combinable with any of the previous or following features, wherein the virtual object is an electronic red envelope.

A third feature, combinable with any of the previous or following features, further comprising: determining a distance between the location of the receiving user and the target location; and in response to determining that the distance is less than a threshold, highlighting a location cue mark at the target location in the live map.

A fourth feature, combinable with any of the previous or following features, wherein scanning the image of the environment of the target location includes: determining a distance between the location of the receiving user and the target location; and in response to determining that the distance is less than a threshold: displaying a virtual object searching page corresponding to the target location; and displaying an image scanning prompt in the virtual object searching page for the receiving user to scan the image of the environment of the target location.

A fifth feature, combinable with any of the previous or following features, further comprising: displaying, in the virtual object searching page, an option for displaying an image scanning clue; and in response to the receiving user's selection of the option, displaying a clue image in the virtual object searching page, wherein the clue image includes information of the second image scanned by the distributing user.

A sixth feature, combinable with any of the previous or following features, further comprising: sending, to the server terminal, a live map acquisition request including the location of the receiving user; and receiving information of the live map from the server terminal.

In a second implementation, a non-transitory, computer-readable medium storing one or more instructions executable by a computer system to perform operations comprising: displaying, by an AR client terminal of a receiving user, a live map associated with a location of the receiving user, wherein the live map includes a target location to which a virtual object was bound by a distributing user; scanning, by the AR client terminal of the receiving user, an image of an environment of the target location; and in response to determining that the scanned image includes a preset bound target, receiving information of the virtual object from a server terminal, wherein the preset bound target is associated with the virtual object and the target location.

The foregoing and other described implementations can each, optionally, include one or more of the following features:

A first feature, combinable with any of the following features, wherein the distributing user binds the virtual object to the target location, and binding the virtual object to the target location comprises: displaying, by an AR client terminal of the distributing user, a virtual object binding page for the distributing user to bind the virtual object to the target location; scanning, by the AR client terminal of the distributing user, a second image of the environment of the target location; determining a bound target from the second image; assigning the determined bound target as the preset bound target; receiving distribution information of the virtual object based on the distributing user's input; and uploading, to the server terminal, the distribution information of the virtual object, information of the preset bound target, and information of the target location.

A second feature, combinable with any of the previous or following features, wherein the virtual object is an electronic red envelope.

A third feature, combinable with any of the previous or following features, wherein the operations further comprise: determining a distance between the location of the receiving user and the target location; and in response to determining that the distance is less than a threshold, highlighting a location cue mark at the target location in the live map.

A fourth feature, combinable with any of the previous or following features, wherein scanning the image of the environment of the target location includes: determining a distance between the location of the receiving user and the target location; and in response to determining that the distance is less than a threshold: displaying a virtual object searching page corresponding to the target location; and displaying an image scanning prompt in the virtual object searching page for the receiving user to scan the image of the environment of the target location.

A fifth feature, combinable with any of the previous or following features, wherein the operations further comprise: displaying, in the virtual object searching page, an option for displaying an image scanning clue; and in response to the receiving user's selection of the option, displaying a clue image in the virtual object searching page, wherein the clue image includes information of the second image scanned by the distributing user.

A sixth feature, combinable with any of the previous or following features, wherein the operations further comprise: sending, to the server terminal, a live map acquisition request including the location of the receiving user; and receiving information of the live map from the server terminal.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: displaying, by an AR client terminal of a receiving user, a live map associated with a location of the receiving user, wherein the live map includes a target location to which a virtual object was bound by a distributing user; scanning, by the AR client terminal of the receiving user, an image of an environment of the target location; and in response to determining that the scanned image includes a preset bound target, receiving information of the virtual object from a server terminal, wherein the preset bound target is associated with the virtual object and the target location.

The foregoing and other described implementations can each, optionally, include one or more of the following features:

A first feature, combinable with any of the following features, wherein the distributing user binds the virtual object to the target location, and binding the virtual object to the target location comprises: displaying, by an AR client terminal of the distributing user, a virtual object binding page for the distributing user to bind the virtual object to the target location; scanning, by the AR client terminal of the distributing user, a second image of the environment of the target location; determining a bound target from the second image; assigning the determined bound target as the preset bound target; receiving distribution information of the virtual object based on the distributing user's input; and uploading, to the server terminal, the distribution information of the virtual object, information of the preset bound target, and information of the target location.

A second feature, combinable with any of the previous or following features, wherein the one or more operations further comprise: determining a distance between the location of the receiving user and the target location; and in response to determining that the distance is less than a threshold, highlighting a location cue mark at the target location in the live map.

A third feature, combinable with any of the previous or following features, wherein scanning the image of the environment of the target location includes: determining a distance between the location of the receiving user and the target location; and in response to determining that the distance is less than a threshold: displaying a virtual object searching page corresponding to the target location; and displaying an image scanning prompt in the virtual object searching page for the receiving user to scan the image of the environment of the target location.

A fourth feature, combinable with any of the previous or following features, wherein the one or more operations further comprise: displaying, in the virtual object searching page, an option for displaying an image scanning clue; and in response to the receiving user's selection of the option, displaying a clue image in the virtual object searching page, wherein the clue image includes information of the second image scanned by the distributing user.

A fifth feature, combinable with any of the previous or following features, wherein the one or more operations further comprise: sending, to the server terminal, a live map acquisition request including the location of the receiving user; and receiving information of the live map from the server terminal.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatus, devices, and machines for processing data, including by way of example, a programmable processor, a computer, or multiple processors or computers. The computer can also be, or further include special purpose logic circuitry, for example, a central processing unit (CPU), an FPGA (field programmable gate array), or an ASIC (application-specific integrated circuit). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/–R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what can be claimed, but rather as descriptions of features that can be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
    displaying, by an augmented reality (AR) client terminal of a receiving user, a live map associated with a location of the receiving user, wherein the live map includes a target of a target location to which a virtual object was bound by a distributing user, wherein binding the virtual object to the target includes:
        scanning, by an AR client terminal of the distributing user, a first image of an environment of the target location,
        determining the target from the first image, and
        binding the virtual object to the target,
    scanning, by the AR client terminal of the receiving user, a second image of the environment of the target location;
    in response to determining that the scanned second image includes the target, receiving information of the virtual object from a server;
    receiving, by the AR client terminal, a gesture input on the displayed live map, the gesture input selecting a cue mark representing the target location, the gesture input being received by the AR client terminal when the AR client terminal at a particular physical location;
    determining, by the AR client terminal, a distance between the target location and the particular physical location of the AR client terminal; and
    displaying, by the AR client terminal, a virtual object searching page corresponding to the target location based upon a relationship between the distance and a threshold distance,
    wherein the virtual object searching page comprises reserved text provided by the distributing user.

2. The computer-implemented method of claim 1, wherein the binding the virtual object to the target further includes:
    receiving distribution information of the virtual object based on input of the distributing user; and
    uploading, to the server, the distribution information of the virtual object, information of the target, and information of the target location.

3. The computer-implemented method of claim 1, wherein the virtual object is an electronic red envelope.

4. The computer-implemented method of claim 1, further comprising:
    displaying, in the virtual object searching page, an option for displaying an image scanning clue; and
    in response to the receiving user's selection of the option, displaying a clue image in the virtual object searching page, wherein the clue image includes information of the first image scanned by the distributing user.

5. The computer-implemented method of claim 1, further comprising:
    sending, to the server, a live map acquisition request including the location of the receiving user; and
    receiving information of the live map from the server.

6. A non-transitory, computer-readable medium storing one or more instructions executable by a computer system to perform operations comprising:
    displaying, by an augmented reality (AR) client terminal of a receiving user, a live map associated with a location of the receiving user, wherein the live map includes a target of a target location to which a virtual object was bound by a distributing user, wherein binding the virtual object to the target includes:
        scanning, by an AR client terminal of the distributing user, a first image of an environment of the target location,
        determining the target from the first image, and
        binding the virtual object to the target,
    scanning, by the AR client terminal of the receiving user, a second image of the environment of the target location;
    in response to determining that the scanned second image includes the target, receiving information of the virtual object from a server;
    receiving, by the AR client terminal, a gesture input on the displayed live map, the gesture input selecting a cue mark representing the target location, the gesture input being received by the AR client terminal when the AR client terminal at a particular physical location;
    determining, by the AR client terminal, a distance between the target location and the particular physical location of the AR client terminal; and
    displaying, by the AR client terminal, a virtual object searching page corresponding to the target location based upon a relationship between the distance and a threshold distance,
    wherein the virtual object searching page comprises reserved text provided by the distributing user.

7. The non-transitory, computer-readable medium of claim 6, wherein binding the virtual object to the target further comprises operations of:
    receiving distribution information of the virtual object based on input of the distributing user; and
    uploading, to the server, the distribution information of the virtual object, information of the target, and information of the target location.

8. The non-transitory, computer-readable medium of claim 6, wherein the virtual object is an electronic red envelope.

9. The non-transitory, computer-readable medium of claim 6, wherein the operations further comprise:
    displaying, in the virtual object searching page, an option for displaying an image scanning clue; and
    in response to the receiving user's selection of the option, displaying a clue image in the virtual object searching page, wherein the clue image includes information of the first image scanned by the distributing user.

10. The non-transitory, computer-readable medium of claim 6, wherein the operations further comprise:
    sending, to the server, a live map acquisition request including the location of the receiving user; and
    receiving information of the live map from the server.

11. A computer-implemented system, comprising:
    one or more computers; and
    one or more computer memory devices interoperably coupled with the one or more computers and having tangible, non-transitory, machine-readable media storing one or more instructions that, when executed by the one or more computers, perform one or more operations comprising:
        displaying, by an augmented reality (AR) client terminal of a receiving user, a live map associated with a location of the receiving user, wherein the live map includes a target of a target location to which a virtual object was bound by a distributing user, wherein binding the virtual object to the target includes:
            scanning, by an AR client terminal of the distributing user, a first image of an environment of the target location,
            determining the target from the first image, and
            binding the virtual object to the target,
        scanning, by the AR client terminal of the receiving user, a second image of the environment of the target location;
        in response to determining that the scanned second image includes the target, receiving information of the virtual object from a server;
        receiving, by the AR client terminal, a gesture input on the displayed live map, the gesture input selecting a cue mark representing the target location, the gesture input being received by the AR client terminal when the AR client terminal at a particular physical location;
        determining, by the AR client terminal, a distance between the target location and the particular physical location of the AR client terminal; and
        displaying, by the AR client terminal, a virtual object searching page corresponding to the target location based upon a relationship between the distance and a threshold distance,
        wherein the virtual object searching page comprises reserved text provided by the distributing user.

12. The computer-implemented system of claim 11, wherein binding the virtual object to the target includes operations comprising:
    receiving distribution information of the virtual object based on input of the distributing user; and
    uploading, to the server, the distribution information of the virtual object, information of the target, and information of the target location.

13. The computer-implemented system of claim 11, wherein the one or more operations further comprise:
    displaying, in the virtual object searching page, an option for displaying an image scanning clue; and
    in response to the receiving user's selection of the option, displaying a clue image in the virtual object searching page, wherein the clue image includes information of the first image scanned by the distributing user.

14. The computer-implemented system of claim 11, wherein the one or more operations further comprise:
    sending, to the server, a live map acquisition request including the location of the receiving user; and
    receiving information of the live map from the server.

15. The computer-implemented system of claim 11, wherein the virtual object is an electronic red envelope.

\* \* \* \* \*